(12) United States Patent
Margulis

(10) Patent No.: US 7,404,645 B2
(45) Date of Patent: Jul. 29, 2008

(54) IMAGE AND LIGHT SOURCE MODULATION FOR A DIGITAL DISPLAY SYSTEM

(75) Inventor: Neal D. Margulis, Woodside, CA (US)

(73) Assignee: Digital Display Innovations, LLC, Woodside, CA (US)

( * ) Notice: Subject to any disclaimer, the term of this patent is extended or adjusted under 35 U.S.C. 154(b) by 323 days.

(21) Appl. No.: 11/255,353

(22) Filed: Oct. 21, 2005

(65) Prior Publication Data

US 2007/0035706 A1    Feb. 15, 2007

Related U.S. Application Data

(63) Continuation-in-part of application No. 11/158,476, filed on Jun. 20, 2005.

(51) Int. Cl.
  G03B 21/00    (2006.01)
  G03B 21/20    (2006.01)
  G03B 21/26    (2006.01)
  H04N 5/21     (2006.01)

(52) U.S. Cl. ............................. 353/31; 353/85; 353/94; 353/121; 348/630; 348/631

(58) Field of Classification Search ................. 353/31, 353/85, 94, 121, 122; 345/202, 506; 348/625, 348/630, 631, 742
See application file for complete search history.

(56) References Cited

U.S. PATENT DOCUMENTS

| | | | |
|---|---|---|---|
| 5,175,808 A | 12/1992 | Sayre | |
| 5,629,737 A | 5/1997 | Menez et al. | |
| 6,006,231 A * | 12/1999 | Popa | 707/101 |
| 6,157,396 A | 12/2000 | Margulis et al. | |
| 6,215,916 B1 | 4/2001 | Acharya | |
| 6,236,433 B1 | 5/2001 | Acharya et al. | |
| 6,275,206 B1 | 8/2001 | Tsai et al. | |
| 6,340,994 B1 | 1/2002 | Margulis et al. | |
| 6,456,339 B1 | 9/2002 | Surati et al. | |
| 6,456,340 B1 | 9/2002 | Margulis | |
| 6,628,827 B1 | 9/2003 | Acharya | |
| 6,819,333 B1 | 11/2004 | Sadowski | |

(Continued)

OTHER PUBLICATIONS

Skodras et al. JPEG2000: The Upcoming Still Image Compression Standard, May 11, 2000, 14 pages.

(Continued)

*Primary Examiner*—Melissa Jan Koval
(74) *Attorney, Agent, or Firm*—Eppa Hite

(57) ABSTRACT

Image processing enhances display quality by controlling both the image modulator and the light sources.

The image processing system utilizes a combination of user inputs, system configuration, design information, sensor feedback, pixel modulation information, and lighting control information to characterize the display environment on a per pixel basis. This per pixel characterization information is combined with one or more frames of the incoming real time display data. The image processing system processes each incoming pixel and produces a modified corresponding output pixel. Each pixel of each frame is processed accordingly.

The image processing system also produces control information for the light sources. The light source control information can control individual lamps, tubes or LEDs, or can control a block or subset of the light sources. The resulting display has improved image consistency, enhanced color gamut, higher dynamic range and is better able to portray high motion content.

15 Claims, 8 Drawing Sheets

U.S. PATENT DOCUMENTS

| | | |
|---|---|---|
| 6,891,672 B2 | 5/2005 | Whitehead et al. |
| 6,901,164 B2 | 5/2005 | Sheffer |
| 2004/0135754 A1 | 7/2004 | Conner et al. |
| 2005/0088622 A1* | 4/2005 | De Vaan et al. ............... 353/31 |

OTHER PUBLICATIONS

Weber et al. Extraction of Crack-free Isosurfaces from Adaptive Mesh Refinement Data, University of California Davis, 2001, 11 Pages.

Balmelli et al. Volume Warping for Adaptive Isosurface Extraction, IEEE VIS 2002 Presentation, 26 Pages.

Brankov et al. Tomographic Image Reconstruction Using Content-Adaptive Mesh Modeling, ICIP-2001 paper proposal, 4 Pages.

Marc Olano, Shrijeet Mukherjee, Angus Dorbie, "Vertex-based Anisotropic Texturing", Proceedings of the 2001 SIGGRAPH/Eurographics Workshop on Graphics Hardware (CA, Aug. 13, 2001).

Seetzen et al. High Dynamic Range Display Systems, Proceedings of the 2004 ACM SIGGRAPH (Los Angeles, CA Aug. 8-12, 2004) 9 pages.

"For LCD Backlighting Luxeon DCC" Application Brief AB27, Lumileds Lighting, U.S., LLC Jan. 2005 p. 7.

Ohtsuki et al. 18.1-inch XGA TFT-LCD with Wide Color Reproduction using High Power LED-Backlighting, Society of Information Display 2002, 4 pages.

West et al. High Brightness Direct LED Backlight for LCD-TV, Society of Information Display Digest 2003, 4 pages.

Biancomano "Dual-output DC/DC drives 16 white LEDs" Sep. 14, 2005, 1 page, CMP Media LLC, http://www.eeproductcenter.com/showArticle.jhtml?articleID=170702099.

Harbers et al, "Performance of High Power LED Illuminators in Color Sequential Projection Displays," 4 pages, Lumileds Lighting, San Jose CA.

West et al, "LED backlight for large area LCD TV's," 4 pages, Lumileds Lighting, San Jose CA.

"Learn About Picture and Sound," 1 page, Philips.

* cited by examiner

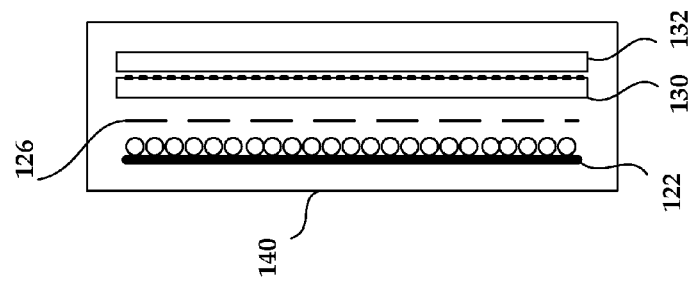
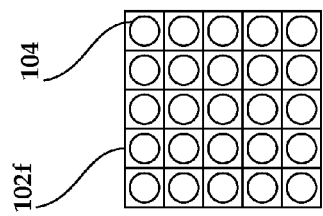
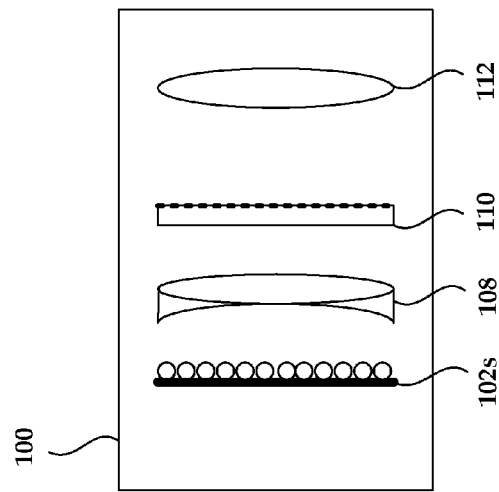

IMAGE AND LIGHT SOURCE MODULATION FOR A DIGITAL DISPLAY SYSTEM

This application is a Continuation-in-Part of U.S. application Ser. No. 11/158,476 filed Jun. 20, 2005.

BACKGROUND OF THE INVENTION

1. Field of the Invention

The present invention relates generally to an image processing and modulation system for a digital display system, and more particularly to performing lighting control along with advanced image processing and image modulation to produce high-quality output images.

2. Discussion of Prior Art

The many types of Flat Panel Display (FPD) technologies include Active Matrix Liquid Crystal Displays (AMLCDs) also referred to as Thin Film Transistor displays (TFTs), silicon Reflective LCDs (si-RLCDs), Liquid Crystal On Silicon (LCOS), ferroelectric displays (FLCs), Field Emission Displays (FEDs), Carbon Nanotube based Nano Emissive Displays (NEDs), ElectroLuminescent Displays (ELDs), Light Emitting Diodes (LEDs), Organic LEDs (OLEDs), Plasma Displays (PDs), Passive matrix Liquid Crystal Displays (LCDs), Thin Film Transistor (TFT), Silicon X-tal Reflective Displays (SXRD) and Digital Mirror Displays (DMDs).

Manufacturing FPDs requires special processing steps and it is often difficult to achieve acceptable visual quality in terms of consistence across the entire area of the display. Besides being a yield issue for new displays, display characteristics can change over operating conditions and over the lifetime of the display. Most FPD technologies also require light sources, such as fluorescent lamps, Cold Cathode Florescent lamps, Ultra High Power (UHP) lamps or Light Emitting Diodes (LEDs) to illuminate the display images. LEDs may be made from a variety of materials and each may have their own "color temperature" characteristics. Other systems may use a hybrid of a traditional lamp along with one or more white or colored LED arrays. In one example system, Sharp Corporation of Japan uses a cold cathode florescent lamp along with red LEDs in a hybrid back light approach for 37" and 57" LCD TVs.

Some of these technologies can be viewed directly as FPDs and others are used as microdisplay devices where the image is projected and a user views the projected image.

Projection display systems may use transmissive or reflective "microdisplay" technologies. To achieve the desired full color gamut in microdisplay based parallel color projection systems, three separate LCD image modulators, one for each of the R, G, and B (RGB) components, may be used. A single LCD image modulator which produces R, G, and B, either through spatial color filters or with sequential color fields at a sufficiently high rate can cost less. Other light sources such as LEDs and lasers may also be used for the different colors with one, three or more imagers. Reflective technologies such as Texas Instruments Digital Light Processing (TI DLP) and technologies such as LCOS imagers are other examples of popular microdisplay technologies. Sony uses a Silicon X-tal Reflective Display (SXRD) microdisplay in some of their rear projection television systems. Other display devices may be based on High Temperature Poly-Silicon (HTPS) technology, Micro Electro-Mechanical Systems (MEMS) or Carbon Nanotubes.

Projection displays have a projection path with associated additional properties. For example, projecting an image from a projector on a level below the middle of a flat screen results in an image which is narrower at the bottom than at the top in what is known as the "Keystone" effect. Radial distortion occurs when an image pixel is displaced from its ideal position along a radial axis of the image. Because an image has the largest field angles in the display corners, the corners exhibit worse radial distortion than other display areas. Radial distortion includes barrel distortion, where image magnification decreases towards the corners, and pin cushion distortion, where the magnification increases towards the corners. Lens related distortions including radial distortion can cause image deformation. Distortion can also result from non-flat screens or the Earth's magnetic field. Shortening the projection path, often done to thin a rear projection system, also increases distortion. The non-uniform projection characteristics of a display system may be represented by a "distortion map" which is based on a single pixel or a group of pixels. A "tessellation map" for characterizing the display distortion may be made up of non-uniform triangles where the mesh of triangles is denser where the amount of distortion is highest.

Image modulators have a fixed number of pixels spaced uniformly in a pattern. Projecting an image from an image modulator to a display screen deforms the uniformity of pixel spacing. In other words, pixels are not correlated one-to-one from a sub-area of the image modulator to the corresponding sub-area of the display screen. Therefore, some screen display areas have more image modulator pixels than screen pixels while other screen display areas have fewer image modulator pixels than screen pixels.

For panoramic displays, motion artifacts appear where image objects move near the edges of curved screens. Even when a flat screen projection is motion-adaptive filtered, the difference in the distances of objects from the projector causes an apparent motion of moving objects on a curved screen. Additionally, extremely large curved screen systems can achieve necessary resolution and brightness only with multiple light sources. Even very large flat screens typically require multiple light sources to accurately control brightness and color. Control of multiple light sources becomes a critical factor in achieving high quality images for large screen format displays.

During the production of content, multiple camera systems are commonly used to improve display quality on curved screen and very large screen displays. For example, two cameras record overlapping halves of a scene to increase the content of the scene being captured. The increase of content results from capturing a wider scene and different angles of the same scene. A layered coding technique may include a standard codec stream as a base layer and enhancement information as a supplemental layer. Even if the two views are from slightly different angles, the compression ratio for the two camera views combined is less than the total compression ratio would be if each view were captured and compressed independently. Additionally, the second camera can provide a view that may be occluded from the first camera.

Systems using additional camera angles for different views can provide additional coded and compressed data for later use. Multiple camera systems can also compensate for the limited focal depth of a single camera and can substitute for the use of a depth-finding sensor which senses and records depth information for scenes. Multiple cameras can also be used to allow a more interactive playback environment where the user can either choose the angle from which to watch a scene, zoom in or out of a scene, or as a result of game play or similar controls, be shown a different view of a scene.

Stereoscopic video capture also uses multi-camera systems in which a first camera records a left-eye view and a second camera records a right-eye view. Because camera lenses focus at a certain distance, one camera uses one focal plane for all objects in a scene. A multi-camera system can use multiple cameras each to capture a different focal plane of a single scene. This effectively increases the focal depth. Digital image processing can further improve focusing for these multi-camera systems.

Types of three dimensional binocular display systems include anaglyph displays, frame sequence displays, autostereoscopic displays, single and multi-turn helix displays. These normally have multiple camera data channels. Anaglyph systems usually require a user to wear red and green glasses so that each eye perceives a different view. Frame sequencing systems use shutter glasses to separate left and right views. Autostereoscopic displays use lenticular lenses and holographic optical elements. Single or multi-turn helix displays use multiple semi-transparent display screens which can be seen by multiple observers without special glasses.

Multiple camera systems can benefit from image processing during both the capture and the playback of the data. During the capture, the different camera images can be registered to each other to create a combined video. The registration gives a way to relate the video from the cameras to each other and to the viewer. In a more sophisticated capture system, the various video images can be captured into a 3D environment where a 3D triangle map of the video images is used to make a video database. During playback, the view seen by the user can be manipulated and, by using the multiple video registration or the 3D triangle map, can be manipulated to give the user the best view. Since the user viewpoint at times will be unique compared to the captured video, the display output system can manipulate the video data via geometric transforms to produce a new view for the user which was not one of the captured views.

Because of inherent response characteristics of LCD materials, LCD-based projection and direct view display systems each have unique flicker characteristics and exhibit different motion artifacts. Further, LCDs switch in the finite time it takes to change the state of a pixel. Active matrix thin film transistor (TFT) displays, which have an active transistor controlling each display pixel, require a switching time related to the LCD material composition and thickness, and to the techniques of switching. The transitions from one state to another are also not necessarily linear and can vary depending on the sequence of pixel values.

The ability to accurately portray each color component for each pixel at each screen location is another desired function of a high quality display device. Since a display output pixel typically consists of a triad (red, green, blue) or other combination of color components, each color component for each pixel is typically made up of multiple sub-pixels. However, the term "pixel" is also used to describe the triad of sub-pixels. Each color component of the pixels mapped to the screen display pixels may transfer non uniformly where some pixels end up too bright and others end up not bright enough. This non-uniformity may be a function of the light path characteristics, the mirrors, the lenses, the lamps or any combination thereof Similarly for LED backlit FPDs, the spacing and positioning of the LEDs may cause non-uniform brightness patterns where the image modulator pixels closer to the LEDs appear brighter than the image modulator pixels further from the LEDs. In the case of colored LEDs or LEDs with color filters, the modulator pixels may be further affected not just with brightness differences, but with color uniformity differences. The brightness of LEDs can be modulated using various Pulse Width Modulation (PWM) techniques or varied by adjusting the voltage or current. The LEDs may be controlled collectively, by proximity in groups, by color, by some combination or in the most sophisticated case each LED can be controlled individually.

Display systems typically include various user controls for color, brightness, white balance (color temperature) and other settings. Users adjust the controls based on preference, ambient lighting conditions, and type of content (video versus computer). Over time, lifetime effects of the display may require the user to make further adjustments or the FPD may automatically make such adjustments. The user adjustments are typically on the entire system, not on subsections of the display, though factory trained technicians using instruments could perform other more sophisticated adjustments. Some display systems include capabilities to measure light output feedback from both lighting sources as well as the ambient lighting conditions. Such a feedback system could be used to compensate for temperature and lifetime effects of the display components and the changing ambient light conditions. The timescale for such adjustments will vary based on the specific measurements and the criticality of the adjustments. Adjustments based on the type of content may be made in multiple seconds, while frame to frame adjustments for dynamic control need to be done much faster, on the order of milliseconds. Adjustments based on ambient light conditions may naturally vary over the time of day as well as with changes to the lamps and other light sources in a room.

FIG. 1A shows a front view of an LED array 102f made up of a structure of multiple LEDs 104. Each LED is a light source which can be either a white LED or one of a variety of colors such as red, green or blue. Other LED colors are also used and the color may be part of the LED structure, may be a color filter as part of each LED or may be a filter mechanism for the array of LEDs. The array of LEDs may be arranged in a pattern of colors so as to produce a controllable and consistent light source that, when combined with an image modulator, is capable of producing the full gamut of display colors.

FIG. 1B shows subsystem 100 which is a side view of an LED array 102s structured from multiple LEDs 104, a multi-lens system 108 and 112 and a microdisplay imager or image modulator 110 that may use a variety of light modulation techniques. The LEDs may be white or multicolored and an additional color system (not shown), such as a color wheel, may also be included in system 100. In one example system, lens 108 concentrates the light through the microdisplay 110, and lens 112 controls the light projection. The projection system may be front or rear projection and use other lenses and mirrors, dichroic recombiners and filters to project the image on a screen (not shown). Microdisplay 110 may be either transmissive, passing modulated amounts of light through each pixel, or reflective, reflecting modulated amounts. The resolution of the microdisplay 110 is typically much higher than the resolution of the components that make up the light source.

FIG. 1C shows subsystem 140 which is a side view of an LCD panel system where a backlight 122 is made up of either strips 122 or an array 102 of LEDs. The LCD display or image modulator 130 typically has a much higher resolution than the resolution of the components that make up the light source. Exceptions include OLEDs, where each LCD pixel has a light source as part of the pixel and as such the resolution of the light sources is the same as that of the display and NEDs, where carbon nanotubes are arranged such that a properly applied voltage excites each nanotube which in turn bombards the color phosphors for the pixels or subpixels with electrons and "lights them up." The brightness and color wavelength is based on the quantity of electrons, the phosphors used and a variety of other factors.

For LED backlit displays, various filters, color and light diffusion gradients, Brightness Enhancement Films (BEF), diffusion plates, light guides and mixing light guides 126 may be used as an option to improve the light uniformity for the display. Some backlit displays may also include one or more optical sensors (not shown in FIG. 1) that can detect changes in brightness and wavelength (see Hamamatsu product brief).

Most LCD-based image modulators (110 and 130) are addressed in raster scan fashion and each pixel is refreshed during each display frame interval. Accordingly, every output pixel is written to the display during every refresh cycle regardless of whether the value of the pixel has changed since the last cycle. Each R, G, and B color component normally has a different intensity value which is digitally represented by a number of bits. For example, if 8 bits represent each R, G, and B color component, then each component has $2^8$ (=256) intensity values from 0 to 255. Changing the intensity value of a color component in an ideal digital device from a number X, for example, to a number Y, takes just as long regardless of the Y value. So in an ideal system, changing a color component value from 2 to 3 takes as long as changing the value from 2 to 200. However, because of the nature of LCD image modulator pixels, the transitions for modulating light intensities are not purely digital, and are not necessarily linear. U.S. Pat. No. 6,340,994 by Margulis et al. teaches Temporal Gamma Processing (TGP) which assures that the time-related representations of an image are as accurate as possible, , based on a previous frame value and a known transfer function of the display modulation system and adjusting its output to a desired value during display of a desired frame.

The light sources for a modulator based system may not be able to accurately and uniformly reproduce the intended color gamut, and different modulator pixel positions on the screen may be affected by the light sources differently, causing a display of non-uniform color and brightness. Additionally, the light sources' output characteristics may change over time and need to be compensated for. The display system may include appropriate sensors to determine the status of the light sources.

Therefore, for all the foregoing reasons, what is needed is an image processing system to effectively enhance display quality by controlling both the image modulator and the light sources and thereby provide better visual images.

SUMMARY OF THE INVENTION

The present invention provides an apparatus and method for performing image processing that controls both the image modulator and the light sources to enhance display quality.

The image processing system considers user inputs, system configuration and design information, sensor feedback, pixel modulation information, and lighting control information to characterize the display environment on a per-pixel basis. This per pixel characterization information is combined with one or more frames of the incoming real time display data. The image processing system processes each incoming pixel and produces a modified corresponding output pixel. Each pixel of each frame is processed accordingly.

In addition to producing modified output pixels, the image processing system produces light source control information which can control individual lamps, tubes or LEDs, or can control a block or subset of the light sources. The light sources will include the lighting elements within the display system and may include lights that affect the ambient lighting around the display as well as around the entire room.

An exemplary Flat Panel Display system has a patterned array of red, green and blue LEDs as the back light and a TFT panel as the image modulator. The 240 LEDs are individually controlled but the resolution of the TFT panel is 1600×1200 pixels. Various filters and diffusion films are used to produce color and brightness as consistent and uniform as possible across the panel. Depending on its position on the panel, each TFT pixel is affected by one or more RGB LED triplets. The Display Output Processing (DOP) for this exemplary system modulates each LED to control its brightness and adjusts the per pixel values for the TFT panel. The resulting display has improved image consistency, enhanced color gamut, and higher dynamic range, and is better able to portray high motion content.

BRIEF DESCRIPTION OF THE DRAWINGS

FIG. 1A is a block diagram of a prior art LED array of individual LED elements;

FIG. 1B is a block diagram showing a side view of a light source, microdisplay image modulator and lenses of a prior art projection system;

FIG. 1C is a block diagram showing a side view of a light source, a filter and an image modulator of a prior art flat panel display system;

DETAILED DESCRIPTION OF THE PREFERRED EMBODIMENTS

The present invention provides improvements in electronic image processing technology and an image processing apparatus for use in an image display system. The apparatus includes a display output processing module that controls both a digital image modulator and one or more light sources illuminating the image modulator.

Figure 2:
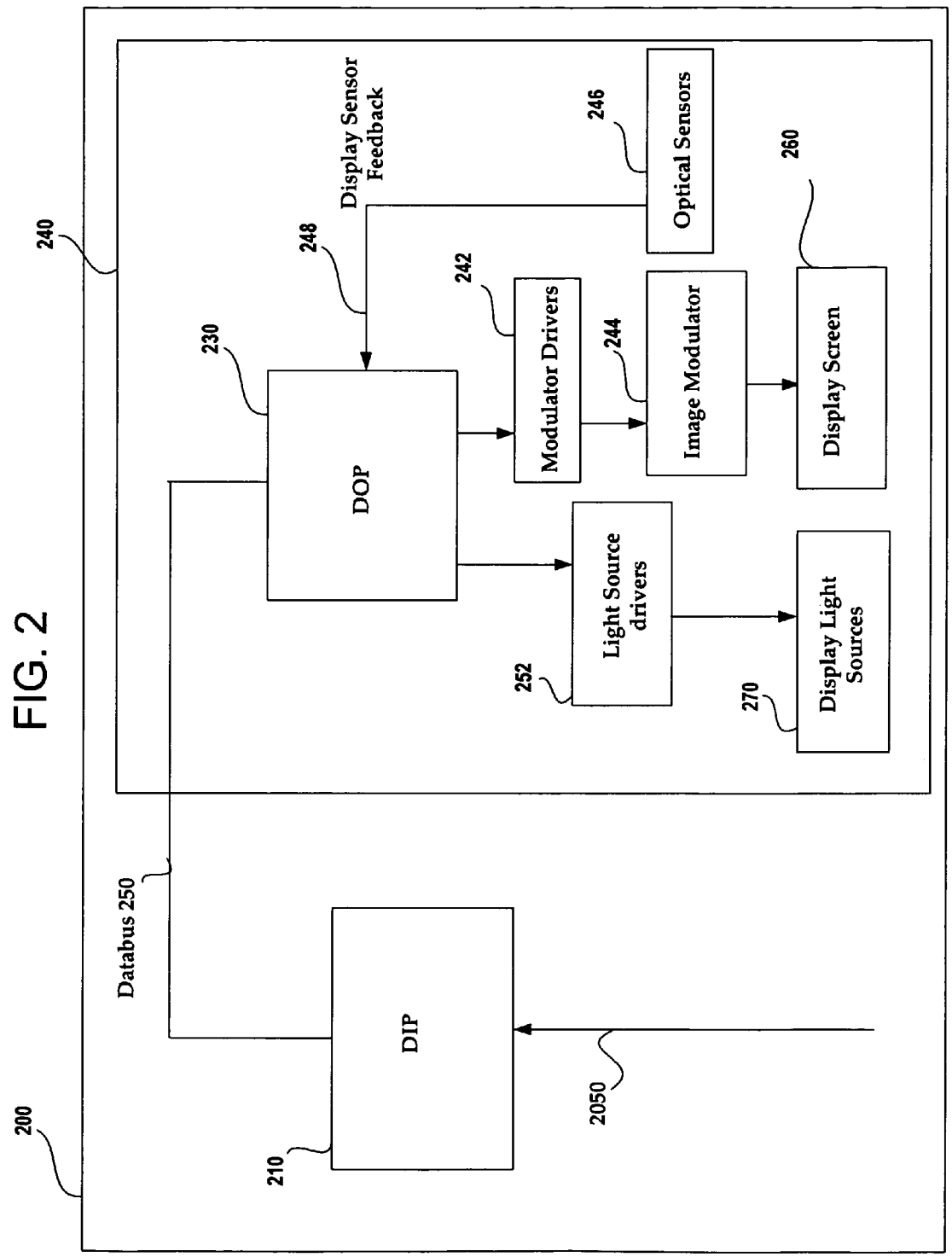
FIG. 2 is a block diagram of one embodiment of the Display Input Processor (DIP) and Display Output Processor (DOP) system in accordance with the invention.

FIG. 2 shows an image processing system 200 which includes a Display Input Processor (DIP) 210 and a Display System 240 including a Display Output Processor (DOP) 230 with a common databus 250 coupling the DIP 210 and the DOP 230. Display System 240 also includes an image modulator 244 (comparable to FIG. 1 modulators 110 and 130) coupled to a display screen 260 and via modulator drivers 242 to DOP 230. DOP 230 also includes light source drivers 252 coupled to the display light sources 270 and receives display sensor feedback via path 248 from optical sensors 246. DIP 210 preferably receives image data on line 2050 and reconstructs images both spatially and temporally. DIP 210 outputs are processed by DOP 230 to enhance visual quality of images and perform display-specific processing.

Image modulator 244 can be part of an LCD-based direct view system such as a TFT display where the display screen 260 is an integrated part of a flat panel display and the modulator drivers 242 control the screen pixels. DOP 230 may also include Timing Controls (TCON) for a flat panel display. If image modulator 244 is part of a projection system, then image modulator 244 provides images to be projected and enlarged onto display screen 260. In a projection system, image modulator 244 is more likely a relatively small (inches) microdisplay element and may be either stationary or movable. The modulator drivers 242 may be relatively simple or, as in the case of a DLP projection system, include complex processing specific to the microdisplay.

The choice of the lighting elements for both FPD direct view screens and for microdisplay based projection systems is a key element to achieving high display quality. In addition to providing the overall brightness to the display, a lighting system of controllable light elements according to the invention can be combined with image modulation techniques to achieve improved display results. With advanced image processing and by controlling both the light elements and the image modulator, digital displays with high dynamic range and an expanded color gamut can be developed. The human eye can often perceive high dynamic range more readily than higher resolution alone; thus a higher apparent quality display can result from a higher dynamic range. LCD material is not able to fully block out very high intensity light, making achieving proper black levels another problem that can be relieved with intelligent processing and controls of the light sources.

Projection systems using scanning lasers with the ability to adjust the light intensity at different points along each scan can produce improved dynamic range displays. Even though the scanning laser may not fully vary the light intensity across the full light range for each pixel, the varied light intensities at the lower resolution can be combined with a full resolution microdisplay to produce a high dynamic range projection system. Multi-wavelength scanning lasers can combine with the microdisplay for a high dynamic range projection system and can also be used to enhance the color gamut. Enhancements for motion portrayal can also be included in the controls for a scanning laser where the scan path of the laser light illumination is coordinated with the scanning of the microdisplay image.

Because the control of the lighting elements is so critical, in addition to processing the pixels for the image modulator 244, DOP 230 performs the processing for controlling the display light sources 270. In the case of a single lamp, the processing may be very simple though the signaling may still pass through a light source driver 252 for isolation from a high voltage lamp. In the case where the display light sources 270 include multiple individually controlled elements, such as with an LED array, DOP 230 may perform extensive processing to determine intensity levels for each of the LEDs. Based on the levels determined by DOP 230, the light source drivers 252 can control brightness signaling for a group of LEDs or for each individual LED. Brightness may be controlled via analog current or voltage techniques, or via a digital Pulse Width Modulation (PWM) means.

In one example, a projection system may use an array of individually controlled LEDs as the light source combined with a DLP microdisplay as the image modulator. The LEDs may be white and be used along with a color wheel or other color system, or multi-color LEDs may be used. Hybrid lighting systems consisting of multiple planes of lighting may also be designed. For example, an UHP lamp can be combined with controlled LEDs, or an LED backlight system can be further enhanced with OLED, NED or other FED based imaging planes. Special location based systems and game machines may combine projection systems with other light sources to achieve different effects. Enhanced environments can be created by combining various light sources, such as lasers and strobe lights, both within the display and within the viewing environment.

Optical Sensors 246 of various types may detect light levels and light wavelengths within the display system and may also detect ambient external light conditions. Sensors may be single wavelength based or may be tristimulus sensors that more accurately mimic the behavior of the human eye. Other more sophisticated optical sensor systems may include imaging sensors, such as cameras that record the images produced by a projection system. The cameras may be part of the assembled display product, or may be used in the production and factory setting of the system and not shipped as part of the product. The optical sensors 246 may require various conversions from analog to digital as well as other signal processing steps that may be performed within the optical sensors 246 module, with an external processing module (not shown) or within the DOP 230. The sensor feedback may be parameterized separately or incorporated into the general display parameters.

Both the DIP 210 and the DOP 230 may have one or more memory buffers, frame buffers, line buffers or caches that can be used by their respective processing. The use of memory buffers is an important consideration as it can affect cost and performance in the design of a system. Of particular note is the use of pipelining operations to reduce overall latency through the system. Where possible, line buffers are used for on the fly processing and frames are stored for processing of subsequent frames. If processing of a current frame requires full access to that frame, then a full frame of latency is added.

DIP 210 and DOP 230 may processes image data in a high-precision internal format to preserve detailed image information, because such information can be lost in each of the various image processing steps if the internal image format has lower precision than the output of image modulator 244. DIP 210 and DOP 230 for example, can produce and maintain a processed image having four times (doubled vertically and horizontally) higher pixel resolution than the spatial resolution output of image modulator 244. Similarly, the internal format for each color component may be maintained at 32 bits or more, such as with floating point values, during the image processing even though the image modulator may be limited to 8 bits per color component. Pixel address information may also be processed with much greater precision using an extended integer or floating point representation than will be ultimately output to the image modulator 244. In a later processing step, the higher internal resolution, color representation and pixel address information may be dithered or otherwise processed to match the required output resolution and format of the image modulator 244.

Figure 3:
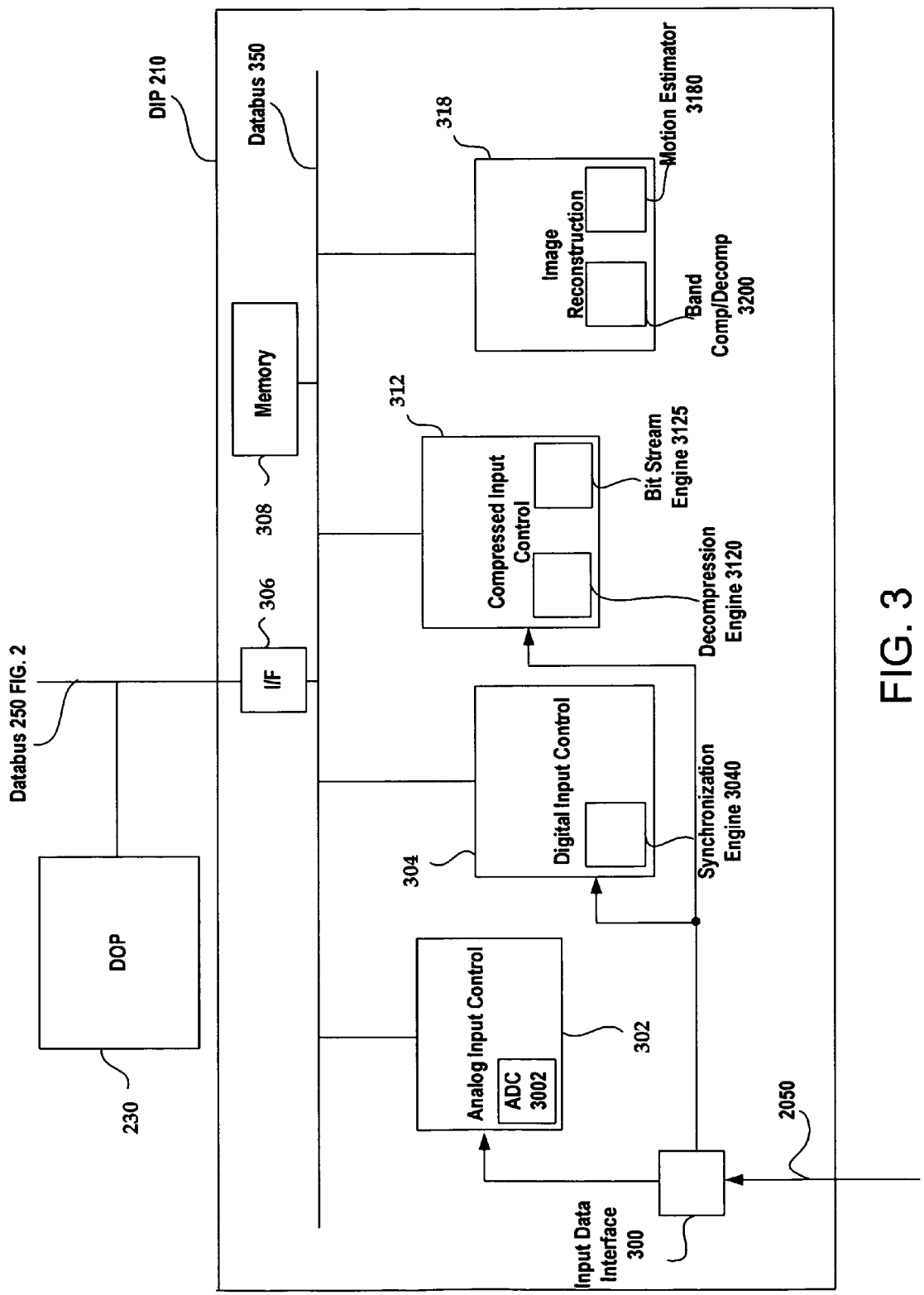
FIG. 3 is a block diagram of one embodiment of the FIG. 2 DIP 210 in accordance with the invention.

FIG. 3 is a block diagram of FIG. 2 DIP 210 which includes image processing modules Analog Input Control 302, Digital Input Control 304, Compressed Input Control 312, and Image Reconstruction (IR) 318, all connected to a common databus 350. Interface 306 can isolate the DIP 210 from the DOP 230 and utilize an interface databus 250 that may follow an industry standard or proprietary format. DIP 210 also includes one or more input data interfaces 300 for receiving image data input on line 2050 from system 200. The image data may include one or more of analog video, digital video, non-tuned data, graphics data, or compressed data. Analog video data may be in a native video format such as composite video, S-video, or some component YUV/YCrCb. Non-tuned data, received from a broadcast delivery system that may have many channels on a common carrier, may require a tuner included in or separate from DIP 210 so that relevant data can be tuned from the channels.

Digital input data may be in an RGB data format or a YUV based video format. Compressed data may be encoded in MPEG-2, MPEG-4 including H.264, Wavelet encoded or another compressed format, which may include video and audio content. The compressed format may include subband encoded data that includes multiple resolutions of the input image frames. Input data may be in a variety of standard and high definition field or frame based formats that also may differ in the aspect ratio of the input image and may differ in the frame rate of the input image. Image data on line 2050 may be encrypted for security and thus require decryption by DIP 210.

DIP 210 also receives, accompanying the image data, various control data including for example selected inputs, data types, Vertical Blanking Interval (VBI) data, and overlay channel information for the On-Screen Display (OSD), and provides this control data to DOP 230. Each of the image processing modules, Analog Input Control 302, Digital Input Control 304, and Compressed Input Control 312, preferably receives image data from interface 300. A system processor (not shown) preferably uses user-selected input controls to select image data, which is appropriately processed by each of modules 302, 304, and 312, and then preferably stored in buffer memory 308. The system processor also uses the user input commands to control windowing for picture-in-picture displays, OSD information, and other system windowing capabilities. DIP 210 preferably processes images in either YUV or RBG formats.

Analog Input Control 302 preferably includes an Analog-to-Digital Converter (ADC) 3002 which samples the analog data inputs and produces digital data outputs. ADC 3002, to achieve high quality, samples its input data frequently and precisely enough that the image can be reconstructed from the sampled data points. Additional prior art techniques for sub-carrier demodulation are used to extract the video data from the analog input signal.

Digital Input Control 304 preferably includes a synchronization engine 3040 and processes digital data, which may be in a YUV video or a digital RBG format. Since the data is already in digital format, Digital Input Control 304 does not include an ADC. Digital Input Control 304 also uses high-speed digital data transmission techniques and may include physical or electrical interfaces such as Low Voltage Differential Signaling (LVDS), Digital Visual Interface (DVI), High Definition Multimedia Interface (HDMI), Video Electronics Standards Association (VESA) DisplayPort, or Serial Digital Video Output (SDVO). These interfaces may include line termination, voltage control, data formatting, Phase Lock Loops (PLLs), and data recovery to assure that Digital Input Control 304 properly receives the digital data input. Other packet based inputs such as VESA Digital Packet Video Link (DPVL) may also be supported over the DVI or HDMI inputs. Other packet and descriptor based inputs may be supported over a network input.

Compressed Input Control 312 may support interface inputs such as a version of 1394A, 1394B or another 1394 format, Universal Serial Bus (USB) or a type of network interface, and preferably includes a decompression engine 3120 and a Bitstream Engine 3125. Network interfaces may include wired interfaces such as 10/100 Ethernet, Gigabit Ethernet, Multimedia Over Coax Alliance (MOCA), Home Phone Network Alliance (HPNA), various powerline based networks, or some other type of wired interface. Wireless Networks may include WiFi (also known as 802.11 with A, B, G, N, I and numerous other variations), Ultra Wide Band (UWB), WiMAX or a variety of other wireless interfaces. In each case, a network interface (not shown) manages and terminates the network data traffic to provide a digital bitstream to the input data interface 300. The data may be additionally formatted either inside or outside the DIP.

The compressed data will usually include audio, video, and system information. System information may identify the bitstream format. Compressed Input Control 312, by performing additional steps such as error checking of coded input, assures that it properly receives the data and that the data is not corrupted. If the data is corrupted, Compressed Input Control 312 may correct, conceal or report the corruption. Compressed Input Control 312, once having correctly received the data, de-multiplexes the data into audio, video, and system streams, and provides the audio streams to an audio subsystem (not shown) for decoding and playback. Compressed Input Control 312 decompresses an encoded bitstream input, but retains relevant motion vector information for use in further processing.

Bitstream Engine 3125 may be combined with Decompression Engine 3120 to optimize reconstruction of compressed input bitstreams into enhanced video frames. If the compressed input bitstream was encoded using subbands, the reconstruction steps preserve the highest quality subband images at each resolution that was encoded. The bitstream information may include compliant video coded bitstreams, bitstreams with side information, layered codings for video and special bitstreams that have additional detail information leaked into a compliant bitstream. Lower-layer coded data can reveal object shapes and other information that can be exploited to provide enhanced spatial and temporal rendering of blocks constituting images. Decompression engine 3120 can perform the prior art steps of decoding a standards-compliant bitstream into a decoded frame.

Bitstream Engine 3125 processes MPEG-2 bit streams including the image blocks (or macroblocks). Most video frames within a sequence are highly correlated and Bitstream Engine 3125 exploits this correlation to improve rendering. Bitstream Engine 3125 also employs motion estimation techniques for motion compensated prediction as a method of temporal processing across image frames. Bitstream Engine 3125 can track the flow of video data prescribed by the prediction blocks belonging to the macroblocks within the bitstream, rather than re-estimating motion or creating the macroblocks similarly to a second pass encoding process.

Bitstream Engine 3125 tracks the prediction blocks over several frames in which the temporal path of the prediction blocks delineates a coarse trajectory of moving objects. This coarse trajectory can be refined by additional sub-block motion estimation and bitstream processing performed either in the Bit Stream Engine 3125 or by the Motion Estimator 3180. Bitstream Engine 3125 preserves the motion vector information for later use in generating DOP 230 output frames in conjunction with motion compensated temporal filtering and other filtering and enhancements related to color representations. The information can also be used for constructing a special block filter for post decompression filtering of the coded input stream so that IR 318 can filter artifacts of block boundary edges.

Other information from the Bitstream Engine 3125, such as the error terms for the macroblocks, indicates how much quantization took place for each block and the IR 318 enhancement steps can utilize this information for noise reduction filtering and any color enhancement processing.

Each input control block may include its own line buffers and memory for local processing and each may make use of a common memory 308. Memory 308 receives data from Analog Input Control 302, Digital Input Control 304, and Compressed Input Control 312, and provides the data to Image Reconstruction 318. Memory 308 also stores IR 318 input frames and output frames. The Image Reconstruction 318 can provide the data through interface 306 to databus 250 or a Direct Memory Access (DMA) engine may be used to transfer the data to databus 250. Databus 250 may be used to transfer data to DOP 230 in an expanded resolution, expanded color range or other enhanced format generated by DIP 210 which differs from the format of the input data that entered DIP 210 via 2050. IR 318 preferably includes a Motion Estimator 3180 and receives image data from Analog Input control 302, Digital Input Control 304, Compressed Input Control 312, or from buffer memory 308. IR 318 processes data based on data types. For example, if data in YUV format requires a conversion to the RGB domain, then IR 318, through either mathematical calculations or a look-up table, converts YUV values to RGB color space and may use an extended range representation of the color component values such as 32 bit integer or floating point. Additionally, YUV data is often sub-sampled, that is, one UV pair may correspond to two or four Y values. Consequently, IR 318 uses the UV values to interpolate and create RGB pixels. If YUV data is interlaced then IR 318 converts the data from field based (sequential half frames) to frame based. IR 318 stores each field in buffer memory 308, then filters, analyzes, and combines the fields to generate an input image frame. IR 318 preferably uses the processed image frames and the motion information created by DIP 210 while the frames and the information are still in their digital format. If IR 318 processes data, such as overlay information, relevant to image modulator 244 (FIG. 2), IR 318 provides such data to DOP 230 to later be combined with the image data frames. IR 318 may process multiple input data streams in parallel and provide such data to DOP 230 to later produce a picture-in-picture display of multiple images. IR 318 also does post decompression filtering based on block boundary information included in the input bitstream.

For analog video inputs, IR 318 preferably uses techniques, for example, from Faroudja Labs, that can sample and reconstruct input video, which includes composite, S-Video, and Component (Y, Cr, Cb) that may follow one of the industry standards such as Phase Alternative Line (PAL) or the National Television Standards Committee (NTSC). To spatially filter for high quality image frames, IR 318 preferably uses various noise reduction techniques such as recursive, median filter, and time base correction.

In the present invention, IR 318 takes account of multiple input images and then, to enhance the resolution of those images, uses super-resolution techniques that employ data shared by different input frames to reconstruct an image, and thereby to produce each output frame. This cannot be done by independently using one input image at a time. The invention is thus advantageous over prior art systems which use super-resolution techniques for generating high-resolution still images from a video sequence, but not for generating real time output frames. This multiframe super-resolution technique can generate an image data superband that represents the input image with higher, typically double, the resolution of the input data. The super-resolution techniques used by the invention depend on a high correlation of the data between frames, and require a sub-pixel shift of the input images which is typically based on the movements of objects in the video image sequence. IR 318, in correlating images to reconstruct output frames, uses motion vectors provided by Motion Estimator 3180 or preserved from the input bitstream. IR 318, while generating still frames, can use mathematical equations from, for example, deterministic techniques of Projections On Convex Sets (POCS) and stochastic techniques of Bayesian enhancements.

When an image does not include motion vector bitstream information, Motion Estimator 3180 preferably uses techniques such as optical flow, block matching, or Pel-recursion to estimate motion that tracks the image object motion in time. Motion Estimator 3180 can also use the same motion estimation techniques in conjunction with MPEG-2 motion vector bitstream information. Motion Estimator 3180 compares groups of pixels from one image field to those of subsequent and previous image fields to correlate object motion. Motion Estimator 3180 then records the detected motion relative to the field position so that DOP 230, together with input frame information and IR 318 motion information, can later generate motion-compensated image frames. For compression systems, Motion Estimator 3180 finds the best match between frames, then codes the mismatches. Motion Estimator 3180 masks out motion vectors that do not meet a certain level of matching criteria, and tags the vectors that have a high level of matching so that these vectors can subsequently be used in more refined motion tracking operations, which are performed on smaller image blocks or on individual pixels. Motion Estimator 3180 thus differs from prior art techniques in which video compression systems use the detected motion as one of the steps to compress the number of bits needed to represent a video sequence. Motion estimation is not used in a standard compliant decoder that simply performs motion compensation using the coded motion vectors and macroblocks. Consequently, the invention, via Motion Estimator 3180, advantageously provides better quality images than prior art techniques.

Because detecting motion is important in restoring images, Motion Estimator 3180 (and other processing modules according to the invention) tracks motion on a sub (or smaller) block basis. For example, instead of on an 8×8 (pixels) block, Motion Estimator 3180 tracks more refined motions on a 2×2 block. To reduce the need to track refined sub-blocks, Motion Estimator 3180 uses the coarse block matching differences to pre-qualify a block, and thus does not perform refined tracking on blocks that are poor matches. Conversely, Motion Estimator 3180 does perform refined tracking on blocks that are close matches.

When receiving motion estimation vectors, such as those provided in an MPEG data stream or another temporal encoding scheme, Decompression Engine 3120 uses all of the vectors for compliant MPEG decoding. IR 318 then uses vectors with better block matching in analyzing refined motions for restoring multiple frames. Analyzing refined motions can produce motion vectors for sub-block pixel sizes, which can be used in multiframe reconstruction to better produce high resolution output frames.

IR 318 preferably separates its output images into video fields or frames, and creates a pointer to the start of each field (or frame). Either the actual field (or frame) data or a pointer to the field (or frame) data may serve as inputs to DOP 230. Processing input video fields and producing frames that combine fields is useful for de-interlacing video in the image reconstruction process, which in turn is useful for increasing image resolution and for restoring the vertical detail that was lost during interlacing as the technique of interlacing trades off the vertical image detail in each field in order to provide half the lines of information twice as often. IR 318 outputs (and DOP 230 outputs), having been reconstructed in accordance with the invention can have a higher resolution than the standard input resolution and can be stored as an image superband. IR 318 outputs can be stored in memory 308 or in a metafile that includes a description of the image both in a spatial RGB frame buffer format and in a semantic description of the image objects, textures, and motions. The digital processing system of the DIP 210 utilizes techniques such as super-resolution to produce images that have higher resolution than the individual input images. Other analog techniques are used in the DIP 210 combined with the super-resolution techniques for producing the high-resolution internal representation of the images.

IR 318 also includes a subband decomposition block 3185 for generating multiple lower resolution images of just-constructed very high quality image frames from input data that was not previously subband encoded. Subbands are typically constructed at steps of one half resolution of the prior step. Subbands can be generated from any image frame including from frames that were decoded from compressed data input that was not prepared for subband encoding. The various techniques described to improve image quality, along with other filtering modes, are used to construct the highest quality image subbands. These subband images, combined with the superband image generated at higher resolution, provide the image data for the Display Output Processing (DOP) steps described with reference to FIGS. 4 and 5 below.

Other than the previously described scheme of utilizing wavelet encoded subbands of image data as the input, in accordance with the invention, a geometric transformation may also be used for processing the input data that includes other forms of layered coding video bitstreams. This geometric transformation may either be performed as part of GT 404 in the DOP, or alternately a Geometric Transform Module may be included as part of the Image Reconstruction 318 in order to reconstruct input video frames. One technique for tracking image flow is to compare the coefficient data of the input bitstream to find the same patterns across time. If the same pattern is found, it may represent the flow of an object across the frames. This technique may be applied to single camera or multiple camera systems.

With layered coding, the conjecture of image flow can be further tested in the different layers and different camera views to either confirm or reject the conjecture. Layered video coding is a technique for scalability which, for example, transmits multiple resolutions of video bitstreams where the higher resolutions utilize the bits from the lower resolution transmissions. In this coding technique, a lower resolution decoder can utilize just the portion of the bitstream required to generate the required resolution. A decoder that requires higher resolution will use the bitstream of the lower resolution and of the additional layers in order to create the higher resolution image.

Layered coding techniques may include other types of compressed data, such as wavelet data, to enhance a base level transmission. For example, wavelet data may be included as a layered stream of data. Wavelet data does not use the same Discrete Cosine Transform (DCT) compression scheme as the standard video portion of MPEG video data. As part of the MPEG syntax, the wavelet data could be coded as a private video data stream, or could be part of the video program stream and indicated in the program header information. The wavelet information represents a higher resolution image for a complete or partial frame for some or all of the MPEG frames. When an MPEG frame that has corresponding wavelet information is decoded, the IR 318 combines the MPEG data with the wavelet data. Because of the different characteristics of DCT and wavelet-based compression, the combination is used to produce a single high quality output frame.

Another example of layered coding is where supplemental bitstream data includes motion estimator information that is an enhancement beyond the standard X and Y macroblock motion estimator vectors that are part of the MPEG standard. For example, motion estimator information that relates to the scale, rotation and shear of image elements can also be provided as supplemental bitstream data. For example, if a camera is zooming in or out of a scene, improved block matching for the encoder system can be achieved by using a scale-based compare instead of the X and Y displacement compare. As a second example, a moving object may rotate instead of move in the X or Y direction. A rotation compare will have a more accurate motion estimator comparison than standard motion vectors. Both the encoder system and the enhanced decoder system need to use a commonly defined protocol to take full advantage of layered coding techniques. IR 318 can use the supplemental information relating to scale, rotation and shear of image elements to reconstruct, preferably-using image transform techniques, a higher quality image from the input bitstream. A multiple camera system combined with a multi dimension playback system can also take advantages of a layered coding technique.

Another enhanced decoder operation of IR 318 uses instructional cues embedded in a bitstream for interpreting the video stream to utilize the macroblock and motion vector information for enhancing output images. The advantages of instructional cues are very significant over the ability to extract frame-to-frame and (Group-Of-Pictures) GOP-to-GOP correlation without the cues. Because IR 318 may maintain complete GOPs in buffer memory 308, IR 318 can utilize these cues which provide information across fields, frames, and GOPs. For example, the enhanced decoder of the invention uses the macroblock information from two GOPS. For another example, IR 318, recognizing the enhanced instructional cues, improves image quality by using macroblock information from both a current GOP and an adjacent GOP. This is therefore advantageous over prior techniques using standard decoders that do not keep previous fields and frame information any longer than required to decode and display output frames. Additionally, the standard decoder cannot recognize the instructional cues across GOPs and will just utilize motion vectors for the best match within adjacent frames. Also, while the enhanced decoder of the invention can use the instructional cues to achieve a higher quality display output, the standard decoder can use the video bitstream in a standard-compliant manner. Instructional cues require adding only a minor amount of data to the bitstream.

Figure 4:
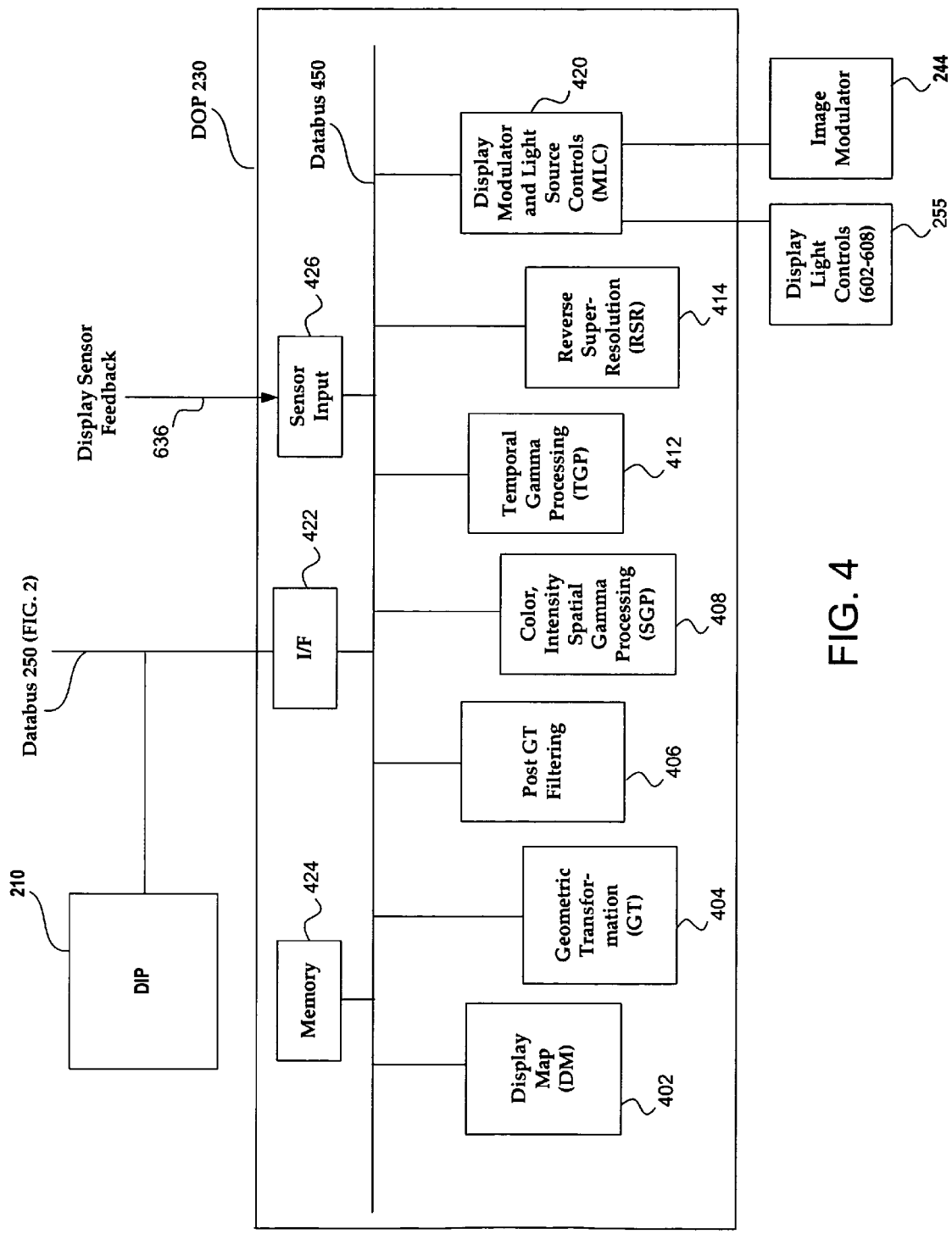
FIG. 4 is a block diagram of one embodiment of the FIG. 2 DOP 230 in accordance with the invention.

FIG. 4 is a block diagram of FIG. 2 DOP 230, which includes the processing blocks for a projection system along with the processing for a display modulator and light source controls. Specific to a projection system is the Geometric Transformation 404 and Post GT filtering 406. The other processing modules including color, intensity and Spatial Gamma Processing (SGP) 408, Temporal Gamma Processing (TGP) 412, display Modulator and Light source Controls (MLC) 420 and Reverse Super-Resolution (RSR) 414, are all connected to a common databus 450. Databus 450 satisfies system bandwidth and concurrency requirements for parallel image processing. DOP 230 also includes buffer memory 424, which stores data frames and image subbands for use by each of the processing modules 402, 404, 406, 408, 412, 414 and 420, although each of these modules may include a local memory buffer (not shown).

There is also a display modulator and light source control block 420 which connects to the image modulator 244 via driver circuits (not shown) and the display light controls 602-608 circuits and may include a Timing CONtrol (TCON)

block, not shown. A system designed for flat panel display systems would not necessarily include the Geometric Transform 404 or the Post GT filtering 406 processing modules. While both a projection system and a flat panel display system would typically have a Display Map 402, the specific information stored and utilized within the Display Map 402 would differ depending on the type of display system.

DOP 230 receives DIP 210 outputs either directly over databus 250, via buffer memory 308 or via buffer memory 424. Utilizing databus 250 allows a separation of the DIP 210 and DOP 230 that can allow for a convenient partitioning where the DIP 210 may be able to perform image reconstruction of various inputs without specific knowledge of the type of display. Databus 250 may be instantiated as an internal bus within a System On Chip (SOC), a bus on a Printed Circuit Board (PCB) between chips, some type of ribbon cable or connector between subsystems, or another type of interface. The DOP 230 processing could begin from the processed and reconstructed input image and specifically process the images for specifics of the display. Alternatively, in a more highly integrated system, some or all of the DIP 210 processing elements may be combined with some or all of the DOP 230 processing elements and the DIP 210 memory 308 may be combined with DOP 230 memory 424. DOP 230 processing could also utilize image data that has undergone wavelet or subband decomposition during the DIP 210 processing steps.

DOP 230 can use pointers (if applicable) to directly access DIP 210 output data. DOP 230 also receives multiple DIP 210 output images for performing picture-in-picture operations where a single image output frame will include more than one processed input video frame. DOP 230 combines overlay data both from the input coded data and from any On-Screen Display (OSD) information such as a user menu selection provided by the system microcontroller (not shown). DOP 230 processes its input images and outputs image data including display coordination for both video and data output, and data and control signals for each R, G, and B image color component.

Due to processing complexity or other partitioning reasons, a single DOP 230 or MLC 420 may not be able to fully control the entire display. Some systems may be designed with multiple DOPs 230 or MLCs 420 where each performs the controls for one of the color planes. In another partitioning, the light control portion of the MLC 420 is separate from the rest of the DOP 230 and multiple MLCs 420 may be used to control different color planes. In such a configuration, the display modulator controls may be performed by another block within the DOP 230, a MLC 420 or by another controller. DOP 230 processing may also be split spatially where multiple DOPs 230 are used for different portions of the display.

SGP 408 converts YUV to RGB color space and determines the intensity values for each of the R, G, and B color components. Those skilled in the art will recognize that a color space conversion is not necessary if the image is already in the RGB color space. SGP 408 preferably uses a look-up table, in which each of the R, G, and B color components has values corresponding to color intensities, to translate image colors. Each R, G, and B intensity value represents an index into the look-up table, and the table provides the output (or "translated") value. SGP 408 independently processes each R, G, or B color component and maps each color component based both on a combination of individual RGB values and on RGB values of surrounding pixels.

Some displays have non uniform brightness and color issues that result from the design of the system. For example, if the LED light sources are not able to provide a uniform light intensity, then a mapping can be created where SGP 408 may adjust the RGB values of the pixels in the identified area and of the pixels in the neighboring area to compensate for non-uniformities of the display. Color and Spatial Gamma Processing 408 uses mathematical calculations, a Color Look-Up Table (CLUT), or a combination of the two to provide the RGB values for mapping the input pixels to the desired image outputs.

A non-linear mapping enables input colors represented by RGB values to be adjusted (emphasized or de-emphasized) during the mapping process, which is useful for crosstalk suppression and for compensation of shortcomings in a color gamut of image modulator 244. In another example, colors that were produced for a movie screen or CRT based system may require further enhancement in order to achieve the desired levels when used with an LCD system. SGP 408, to realize a non-linear relationship, uses a translation table represented by a number of bits that is larger than the number of data input bits. For example, if eight bits represent $2^8$ (=256) color component intensity values, then Color and Spatial Gamma Processing 408 uses, as another example, 10 bits to represent $2^{10}$ (=1024) translated values. A system manufacturer maps 256 values to 1024 translated values.

Displays that can display both very dark black as well as very bright light colors are said to have a high contrast ratio. Achieving high contrast ratios with LCD-based flat panel displays is typically difficult as the LCD material has difficulty blocking out all of the light from very bright backlights for display images that are meant to be very dark. Additionally, display modulators may attenuate the light source for display images that are meant to be very bright. Using low reflective coatings on the display front glass is helpful in achieving darker black colors, though it might attenuate and dull the brightness and colors. In a preferred embodiment of this invention, combining the image data processing for the image modulator 244 values and light intensity values, the resulting display image has a higher contrast ratio and increased color gamut. Color, Intensity, Spatial Gamma Processing (SGP) 408 provides processing not only for the image modulation 244 pixel data, but also for the light intensity values. The SGP 408 operates on a per pixel basis where the gamma processing per pixel will vary based on the parameters for each pixel location. In a simple embodiment for high contrast spatial processing, contrast for lights and darks may dynamically be increased where blacks are made darker and whites are made brighter with the controls for darkening and lightening include both light source modulation and image modulation.

Beyond just the traditional contrast ratio, by controlling the light levels for different display frames, and within different regions of the display for a single frame, the system is able to achieve High Dynamic Range (HDR). High dynamic range usually corresponds to the physical values of luminance and radiance that can be observed in the real world. HDR image formats are sometimes considered scene-referenced instead of device-referenced and the SGP 408, TGP 412 and MLC 420 will process such HDR content with different algorithms to preserve the HDR. The system 200 can make use of additional bits of color information that were either transferred to the system via input 2050 or by Image Reconstruction 318 extrapolating such information from another type of input stream. Newer content sources such as High Definition DVD players (HD-DVD) utilizing Microsoft Windows Media, H.264 or another encoding scheme may include additional bits of color information to provide HDR content.

In another embodiment an image has a higher resolution than the image modulator can natively support. This may be a source image or an image that has been reconstructed by IR 318 or by another means. In order to display the full resolution of the source image, special processing is performed with respect to dynamic range. The image is filtered down to a lower resolution image to match the image modulator. The enhanced dynamic range of the display is used so that the user perceives he is viewing a higher resolution image than would otherwise be possible with the image modulator and standard dynamic range.

Temporal Gamma Processor 412 assures that the time related representation of an image is as accurate as possible. TGP 412 thus, based on a previous frame value and a known transfer function of the display modulation system, adjusts its output values to provide a desired output value during a desired frame. TGP 412 independently processes each R, G, or B color component and compensates for modulating transition characteristics that, due to the nature of an LCD image modulator 244, are not pure digital. TGP 412 also provides the information for the Display Modulator and Light source controls 420 with the required information to overdrive the LCD image modulator 244 to compensate for the LCD material characteristics, so that the desired output can be achieved more expeditiously. Consequently, TGP 412 overcomes the video quality limitation of prior art systems having materials that produce blurred outputs. TGP 412 can also reduce the cost of the display system because the materials used for image modulation in prior art systems that provide faster image responses are usually expensive. Like SGP 408, TGP 412 may perform per pixel gamma processing.

In addition to compensating via control of the image modulator 244, the Temporal Gamma Processing 412 also provides the temporal processing for the various light sources. By utilizing the temporal processing for the light sources, the response time of the image modulator 244 pixel values can be improved. For example, if a pixel value for the color green is to change from 32 to the maximum of 255, the green value for that pixel can not be overdriven since it is already at the maximum value. However, if there is a green LED that effects that pixel, the green LED intensity value can be effectively increased such that the viewed pixel value at that location can be 255 right away even though the value at the imager may still not have fully transitioned to 255. Since the LEDs effect more than one pixel on the modulator, other compensation for both surrounding pixels and possibly for the other LEDs needs to be included in determining the right values for the overall image. The Color, Intensity, Spatial Gamma Processing 408 works in conjunction with the Temporal Gamma Processing 412 to achieve optimized controls for both the image modulator 244 and the display light controls 602-608.

For systems where the DOP 230 has knowledge of the image motion for various pixels, the SGP 408 and the TGP 412 may use motion information associated with each pixel or block of pixels in order to determine the amount of color enhancement performed. This type of processing is based on the ability of the eye to discern color information, and image resolution is affected by the amount of image motion. The motion information and subsequent color enhancement criteria may be part of the original motion vectors, error terms associated with the original motion vectors, or motion information determined from a motion estimator within the display system. By understanding the motion of the pixels, the amount of color enhancement can be increased or decreased to best optimize viewing.

Reverse Super-Resolution (RSR) 414 performs a superset of the frame rate conversion process for converting between disparate input and output frame rates, and can improve display quality when intended display images have a higher resolution than can be supported by the number of pixels of image modulator 244. RSR 414 simulates higher resolution outputs by sequencing lower resolution images at higher frame rates where each of the lower resolution images is slightly different and at a slightly different position. Thus, for example, RSR 414, block by block, spatially filters one frame in a video sequence having a transfer rate of X frames per second (fps) to Y number of RSR frames having a transfer rate of Z fps, where Z=X×Y. RSR 414 then shifts by the same pixel (or pixel fraction) amount the pixel matrix representing each RSR image block. For example, because there are Y RSR frames, RSR 414 shifts the pixel matrix block Y times, once for each RSR frame, and each shift is by the same pixel (or pixel fraction) amount. The number of pixel fractions to be shifted depends on the physical characteristics of the display system and of image modulator 244. Where a system adjusts the position of the viewed image, the shift fraction corresponds to the physical movement of the viewed displayed image. Where there is no actual movement of the displayed image, the fractional adjustment is based on the physical nature of the display device such as the pixel size relative to the size of image modulator 244 and to the projection characteristics of the system.

RSR 414 then produces each RSR frame with a motion-compensated weighted filtered center so that the center of the input image for each RSR frame is maintained such that no motion artifacts are introduced. A pixel-matrix weighted filtered center is the center of a pixel matrix taking account of filter weights in a filter transfer function. Filter weights, varying depending on the filter characteristics, are the values (usually of multiplications and additions) which are combined with the input pixel values to produce the filtered image output. A filter transfer function uses filter weights to transform an input image to an output image. Output image pixels, based on a transfer function, can be adjusted to move the corresponding image. RSR 414 preferably uses image blocks having 8×8 to 256×256 pixels where each block has uniquely processed motion information. For static images, RSR 414 produces a sequence of frame-rate-adjusted output frames based on the difference between the input and output frame rates. For motion pictures, RSR 414, at the time of the output frame, portrays the intermediate position of the image and compensates for the image motion. With increased processing, each pixel or sub-pixel will have its motion information processed uniquely.

In an alternative embodiment of the invention, the RSR 414 utilizes a stationary display (image) modulator with multiple moving light sources and utilizes the RSR 414 processing to determine the lighting patterns. The lighting elements may move in a fixed pattern as dictated by a mechanical structure such as one or more rotating color wheels of LEDs. Alternatively, the lighting elements may be lit in any pattern such as by a voltage field applied to an FED or NED based backlight. The RSR processing performs lighting optimizations multiple times within a frame display to improve the dynamic range and perceived resolution of the display.

While traditional filtering techniques may be used by DIP 210 and after Geometric Transformation, the GT 404 has the ability to perform the mapping of the DIP 210 superband outputs to the image modulator 244 to pre-compensate for distortions that occur during projection from the modulator to the display screen. Similarly, the GT 404 can use the DIP 210 subband outputs to perform non-linear filtering and scaling to produce the luminance mapping for the light sources. Since the resolution of the light source is typically lower than that of the original image, starting from the subband data saves on the amount of computation for determining each light source value. The filtering to produce the luminance map may follow a variety of techniques from simple weighted averaging to more complex de-convolution filtering and other types of filtering In the FIG. 4 embodiment, DM 402 stores various forms of system transfer information for use by the DOP 230 to pre-compensate the image data prior to writing to the imaging device. This information varies based on the type of display system and may have any number of parameters. For example the DM data may be a simple one-to-one map of data corresponding to image modulator 244 (FIG. 2) characteristics at chosen pixel or screen locations. DM 402, where applicable, also stores a memory description corresponding to each display pixel or a shared description of groups of display pixels or pixel sectors. Such a description may be stored in a delta or difference format where the complete information exists for one pixel, referred to as an anchor pixel, and the information for the surrounding pixels is a difference from the anchor pixel and requires less storage. Because the description does not change on a frame-by-frame basis, DM 402 preferably reads the description only once during the display process. DOP 230 then uses the description information to generate image frames. DM 402, when reading data, uses a set of control registers (not shown) that provide references to the data blocks.

DM 402 data varies and may include, for illustrative purposes, manufacturing related information, system configuration information, and user data. Manufacturing-related information may include, for example, a map of locations, usually compiled at assembly time, of defective or weak pixel display bits, correlation data of ideal radial imperfections and of optically distorted projection, and correlation data for alignment points for image modulator 244. System configuration information, through an automatic self-calibration, may include, for example, a registration map having adjustable intensity values for each R, G, and B color component and the color component pixel offset at given locations. The format for such a registration map may be based on anchor pixels where only difference information is stored for surrounding pixels. Such a registration map may be stored in flash memory or another type of non-volatile memory.

DM 402, where applicable, preferably uses sensor techniques, such as sonar range finding, infrared range finding, laser range finding, or optical techniques of displaying and capturing known patterns to measure distances and distortions from a projector to different parts of a display screen (not shown). The use of image sensors and digital camera technology for the capture of images from the display screen represents a good example of optical techniques. Combined with known pattern projections, sophisticated models can be built of the projection path that include X, Y and Z displacements for different pixel locations and for triangle mesh patterns. DM 402 then uses these measurements to mathematically characterize and model a projection display system. DM 402 thus allows projecting images onto a mathematical approximation of a display screen surface. User data includes user preference information such as brightness, color balance, and picture sharpness that are input by a user during a setup sequence.

In a different implementation, DM 402 includes a triangle mesh to represent the transfer characteristics of a projection system. The triangle mesh may be non-uniform where the triangles' sizes and orientations vary over the display. The triangle mesh may be built from an importance map whose density varies in accordance with the amount of distortion for a particular area of the display. Techniques such as adaptive isosurface extraction may be used to generate the triangle mesh. Optical techniques of using cameras both inside and outside the display system can be combined with a series of known image patterns to determine the triangle mesh information. Information on the characteristics of the texture mapping hardware may also be used in determining the triangle mesh. The triangle mesh may also be modified to perform other system functions such as format conversion of 4:3 input to match the display output resolution of 16:9 aspect ratio.

Though both a flat display screen and cameras include only 2D (X and Y) dimensions, the projection distortion includes a 3D depth (Z) component. If the Z value is ignored, various types of perspective distortion may be introduced into the system. In some systems that may be acceptable and in others higher quality may be desirable. By using known patterns for projection and comparing those images with the captured representation of the image, the Z values can be determined. For example, the interpolation of a line based on X and Y vertices where no Z value is included may appear as an arc which indicates perspective distortion, since the combination of the X and Y displacement and the Z displacement all contribute to the warping of a line into an arc. Those skilled in the art will recognize that by varying the input pattern along with recording the viewable pattern, a "curve fitting" algorithm can conclude the proper X, Y and Z vertex values for a tessellation map to best represent the distortion of the projection path. Once the proper X, Y and Z values for the vertex are used, the interpolation across triangles will result in straight lines that are not distorted into arcs. The tessellation map of the proper vertex values is used during the texture mapping modes as described elsewhere in this disclosure.

The display tessellation map will include the location information for each triangle vertex and may also include other color and intensity information either as part of the same triangle mesh or in a separate triangle mesh. In a system that includes a more sophisticated setup procedure, the vertex information will include differing Z values (depths) for each vertex. Each color component may require different mappings to represent how the color path varies over the complete display surface. A triangle mesh can be ordered as individual triangles, triangle strips, triangle fans or some other organization. Other mathematical representations such as B-Spline may also be used. DM 402 preferably provides data, either directly or through buffer memory 424, to Geometric Transformation module 404.

In accordance with the invention, Geometric Transformation 404 advantageously redefines the spatial relationship between pixel points of a compensated digital image that, when displayed, exhibits the highest possible image quality. Geometric transformation, also referred to as warping, includes image scaling, rotation, and translation. Geometric Transformation 404 resamples data to produce an output image that can readily map onto FIG. 2 image modulator 244. However, the Geometric Transformation 404 output data points, due to scaling or resampling, may not correspond one-to-one to data points of the image modulator 244 grid. Consequently, DOP 230 includes Post Geometric Transform Filtering 406 to filter the transformed data samples from Geometric Transformation 404 and thereby produce an output pixel value for each data point of image modulator 244. Since the modulator is a 2D device having points in an X and Y plane, the transform includes mapping any depth information onto the 2D device. Post Geometric Transform Filtering 406 uses spatial filtering methods to smooth the image and to resample, and thus properly space, the data samples.

Geometric Transformation 404 also improves display image characteristics related to image modulator 244 and the display system. For image modulator 244 screen regions that have more image modulator 244 pixels than screen 260 has pixels, Geometric Transformation 404 adjusts the pixel values by a spatial filtering to reduce differences in neighboring pixel values. Consequently, the corresponding image is smooth and does not contain artifacts. For screen display regions that have fewer image modulator 244 pixels than screen 260 has pixels, Geometric Transformation 404 uses edge enhancement filtering to increase differences between neighboring pixel values to pre-compensate for distortion that will be introduced when image projection spreads out neighboring pixels.

Geometric Transformation 404 preferably uses filtering algorithms, such as nearest neighbor, bilinear, tri-linear and anisotropic filtering, cubic convolution, sync filters, or cubic spline interpolation, to process images and thus produce accurate interpolated image pixel values. Further, where multiframe reconstruction requires, Geometric Transformation 404 uses time-varying multiframe filtering methods including deterministic techniques such as Projection Onto Convex Sets (POCS), and stochastic techniques such as Bayesian filtering. Based on the computation complexity, Geometric Transformation 404 chooses an appropriate filtering technique. For clarification, anisotropic filtering is a method of enhancing the image quality of textures on surfaces that vary in distance and may be angled with respect to the distance. Anisotropic filtering may use a single texture map, like bilinear, or multiple texture maps like trilinear where anisotropic filtering has the added advantage of introducing less blur in the process and thus preserves more detail. Anisotropic scaling occurs when something is scaled by different amounts in different directions. An example is scaling a 64×64 source pixel texture to cover a 14×30 pixel output rectangle.

Geometric Transformation 404 can improve image deficiencies related to the screen 260 environment. Geometric Transformation 404 performs a spatial projection which warps the image to compensate for a curved display screen 260 as is usually used in front projection theater systems, and subsequently uses bitstream information to improve the image. For example, if it can acquire the depth of moving objects, Geometric Transformation 404 can reduce the distorted motions at the edges of a curved screen 260. Geometric Transformation 404 constructs an optical flow field of the moving objects along with the object distance information. Geometric Transformation 404 then uses motion adaptive filtering to construct a sequence of output frames that position the objects at the proper spatial coordinates in the time domain. Geometric Transformation 404 thus, during projection onto a curved screen 260, conveys the proper motion of all objects in a scene. Geometric Transformation 404 also works in conjunction with an optical correction to ameliorate distortions resulting from the different focal distances from a projector (not shown) to different parts of screen 260. Geometric Transformation 404 uses the information from optical based pattern projection and capture techniques (discussed above) that model the screen 260 environment and then uses the model in the form of a display tessellation map to mathematically compensate for image distortions. Geometric Transformation 404, to correct a warping distortion produced by an optical system, uses similar triangle based display tessellation mapping of a flat screen to apply to a curved screen.

The transfer function for the path from the image modulator 244 to the display screen 260 changes if the display screen is curved. The curve of the display screen becomes part of the transfer function of the display system. The geometric transformation can incorporate the curved display screen contribution to the transfer function and the tessellated triangle mesh values and compensate accordingly. The benefit of incorporating the screen curvature in the transfer function is that the geometric transformation operation only needs to be performed once to compensate for both the system distortions and the screen curvature.

Geometric Transformation 404 uses special processing, similar to the curved screen 260 processing, for various Head-Mounted Displays (HMDs). An HMD is a display unit combined with a helmet or glasses that a user wears, and usually includes two image modulators 244, one for the right eye and one for the left eye. HMDs are useful for a single viewer and, because of their physically smaller areas, they typically display high quality images.

Geometric Transformation 404, without considering motion adaptive filtering, treats image spatial projection with warping onto a curved screen 260 in the context of 3D graphics. Geometric Transformation 404 considers a display image frame as a 2D texture and considers a curved surface as a 3D surface. Geometric Transformation 404 then maps the 2D texture, which may be video, onto a surface that is the mathematical inverse of the curved screen 260. Geometric Transformation 404 thus pre-corrects the image frame so that, when projected, the mapped image will have filtered out the distortions associated with a curved screen 260.

Geometric Transformation 404 preferably employs techniques such as anisotropic filtering to assure that the best texture is used in generating output pixels (see Marc Olano, Shrijeet Mukherjee, Angus Dorbie, "Vertex-based Anisotropic Texturing," *Proceedings of the* 2001 *SIGGRAPH/Eurographics Workshop on Graphics Hardware* (Los Angeles, Calif., Aug. 12-13, 2001), ACM SIGGRAPH, New York, 2001). Instead of using the simpler bilinear single texture resolution, texture samples are best used from the different subband and superband representations of the image frame in what is associated with tri-linear modes. By providing the different bands, the anisotropic filtering can utilize texture samples from more than one resolution of the texture much like in the tri-linear modes but with the added processing of the anisotropic filtering. Geometric Transformation 404 also preferably uses filtering techniques such as sync filters, Wiener deconvolution, and POCS, and/or other multipass filtering techniques to filter the images off-line and then output the filtered images onto a film recorder. While it is possible for a Geometric Transformation 404 to sample all of the desired pixels from a single image map and produce the desired output, GT 404 may also allow some of the more common operations, which may need to be done numerous times, to be performed at different stages of the image processing pipeline. By doing this staging of the processing, operations such as subbanding and superbanding can be optimized for different memory accesses and the resulting image bands reused by the GT 404.

For example, an image could be filtered to one half resolution using line buffering that stores eight lines of the input image and utilizes 128 pixels per line and the eight lines to produce a highly optimized one half resolution image. Such processing could be done in the input path or in IR 318, and the filtered one half resolution image could be available to the GT 404 as an image subband. To perform the equivalent downscaling operation in the geometric transform operation requires use of 1024 texture samples from the original image. If the GT 404 includes a memory buffer or texture sample cache, the accessing of the texture samples can be included as those same texture samples would typically be needed for the other geometric transform operations. In cases where the GT 404 has both the access to enough texture samples and the sufficient computational throughput to perform the complete operation including the scaling of the image, then the GT 404 would use the highest resolution image band for the texture samples. If, however, the geometric transform operation is limited in either the number of texture samples or the amount of computation, a superior image can be generated by using texture samples from both the highest resolution image sub-band and the other specially filtered and scaled image sub-bands. Even with the different staged processing, it is often necessary for the GT 404 to perform multiple passes in order to complete the desired operations.

Geometric Transformation 404 processes video in other 3D texture mapping modes too and may use systems that accommodate multiple textures in images. For example, Geometric Transformation 404 can use high quality texturing techniques such as bump mapping and displacement mapping which apply multiple texture maps to an image. These multiple texture map modes may use different subbands of the image data as texture sources as well. As another example, Geometric Transformation 404, to model the graininess inherent in photographic film, may apply multi-surface texturing to give video a more film-like appearance. Geometric Transformation 404 can allow a user to select the graininess modeling feature as part of the setup procedure, similar to selecting room effects such as "Hall," "Stadium," etc., in an audio playback option. Geometric transformation 404 can also correct for color amplitude disparities by using the light source techniques associated with different lighting models in a 3D system.

The algorithm for determining the fitting of the tessellation map to the transfer function of the system can be based on a variety of techniques and can be tuned to the specific non-uniformities of the system. Additionally, since the Geometric Transformation 404 and texture mapping techniques are typically known at the time the tessellation mapping algorithm is decided on, any particular characteristics of those processing steps can be taken into consideration as part of determining the triangle mesh. Unlike interactive 3D games where the tessellation map changes every time the user moves, the tessellation map for this type of system can remain essentially constant as the projection path is not typically changing in real time. For applications that support location based entertainment systems or immersive 3D virtual reality systems, the projection path may indeed be adjusted in real time.

The tessellation mapping algorithm and resulting triangle mesh may be generated by a variety of techniques including generating various test inputs and capturing the test images to measure the transfer function of the system. Test inputs can include single pixel or single line images, different shapes projected onto different parts of the display screen, and also can vary the color components and color intensities. The ability to process real time video images may be bound by some combination of the number of triangle vertices, the amount of processing done for each vertex and the fill rate for the processing of the non-vertex pixels of each triangle. It is because of these various processing steps that having too many small triangles may not be practical. Having too few large triangles may not give good results either. So coming up with the technique that utilizes the smaller triangles where they are needed is an important step in the triangle tessellation.

While not typically considered, it is possible for a more sophisticated system to include real time image data in determining the triangle mesh and come up with a new dynamic tessellation technique. The advantage of such a dynamic tessellation technique is that the areas of the display that have the most activity and high frequency content can dynamically be allocated a finer triangle mesh whereas the areas of the display that have less activity and less high frequency content can dynamically be allocated a coarser set of triangles. The amount of high frequency activity in an area of the display may be determined by the Bit Stream Engine 3125 for a compressed data stream or by the Image Reconstruction 318 block. The determination can be based on different coarse quadrants of the display screen, moderate size tiles, smaller size precincts or all the way down to code blocks. The dynamic tessellation would then use the transfer information of the system along with the real time content information to determine how best to choose the triangle mesh for a given image or sequence of images. Additional information regarding the texture mapping techniques used in the system may also be used in choosing the triangle mesh.

Geometric Transformation 404 can process digital data from a multi-camera system to improve the focus, and thereby provide higher quality images for image modulator 244. Geometric Transformation 404 evaluates which of the multiple camera views provides the best focus for an object and then reconstructs the object in proper perspective. Geometric Transformation 404 then combines the multiple camera views on a regional or object basis to produce output images. Multiple camera views can also be used for multi-frame image reconstruction.

Geometric Transformation 404 can also use multi-camera bitstream information included in the image data to determine the object depth of a scene and to construct a 3D model of the shape and motion pattern of the moving objects. Geometric Transformation 404 then uses the same bitstream information to solve problems related to a curved screen 260 projection to achieve proper object motion completely across the screen 260.

Geometric Transformation 404 can also improve auto stereoscopic 3D display systems in which multiple camera channels present a binocular display and each of a viewer's eyes sees a respective monocular view of a scene. The video input from multiple cameras, combined with knowledge of the position of the camera, enables generating a 3D display. The positional information is used during the display process so the viewer will see camera views from the proper right and left eye viewpoints. In another system, supplemental bitstream information can explicitly indicate objects in the video, as well as the depth and motion of these objects. The GT 404 can use the positional camera information as well as explicit object information to transform the display output data. Geometric Transformation 404 can construct each of the monocular views in accordance with the focus and motion adaptive filtering techniques described above.

The techniques for matching viewer positional information and multiple camera views can be used for multiple screen entertainment systems. These entertainment systems may involve some combination of moving and stationary screens as well as moving or stationary viewers. One example application is a theme park ride where the viewer sees multiple screens while he is moved along the ride path. The ride path may be either pre-determined or interactively determined.

For multiple video input systems, the Geometric Transform module 404 can be used for performing special effects and real time transitions between video streams to improve the user interface. For example, when changing channels, instead of abruptly changing from one channel to another, the geometric transform module can fade one channel and blend it into the new channel. Fades and blends typically keep the video pixels at the current locations and perform weightings to increase or decrease the intensity of the pixel values. This is also used for menu overlay features such as on line program guides and user setup menus. The Geometric Transform module 404 can also perform more advanced transitions such as wipes or warps. These more advanced transitions involve warping the video image by changing the spatial coordinates of the video image. One technique for performing these effects is to use video as a texture map and to apply the video texture map in real time to the changing display map. When the image subbands are produced with higher quality than would be produced by using the GT to downscale the image along with the other processing required by the GT 404, making use of the image subbands improves the quality for the various geometric transforms.

Based on the DM relating to the projection system characteristics, the GT 404 performs the image transformations. The various processing stages of the GT 404 are able to use image subbands from the original image to process and create the new image output frames. In some cases, additional sampling techniques may be used on the output of the DIP 210 to produce the data for the DOP 230. Geometric transformation of digital images is a sampling process and is susceptible to aliasing artifacts. Simple sampling techniques such as point sampling are not sufficient to avoid aliasing. Instead, techniques such as area sampling, supersampling, adaptive supersampling, stochastic sampling, poisson sampling, jittered sampling, point diffusion sampling and adaptive stochastic sampling may be needed. Other more advanced convolution techniques are also used in sampling, and even after sophisticated sampling is used, post sample filtering is required. As with all well designed adaptive algorithms in this patent, special filtering is used to prevent artifacts that would result from sudden changes in algorithm within the same image or image sequence.

As part of the DOP 230 operations, it may be necessary for video frames to be combined with graphics frames where the graphics frames may be input to the system over one of the digital or network interfaces or the graphics frames may be internally generated by the DOP 230. In either case, the graphics frames will require pre-compensation processing to assure that the output image is properly displayed. This may either be done in conjunction with the video images or independently from the video images and then combined. In the simple case of combining the graphics and video, a masking or overlay operation may be performed where on each pixel basis either the video or the graphics information is displayed. A more sophisticated approach of overlaying the graphics with the video uses different levels of transparency. The technique of supersampling or multisampling, where each pixel is divided into subpixels, is used in generating the graphics images to implement anti-aliasing. Even in the case where the graphics image has been processed independently for anti-aliasing to avoid jagged edges, the combined effect of the graphics and video may still have undesirable visual artifacts where the graphics and video pixels meet. An improved method for combining the video and graphics frames is for the Geometric Transformation 404 to perform anti-aliasing which may be combined with texture transparency modes to improve the overall look of the combined video and graphics image. The function of the anti-aliasing techniques is to combine the video and graphics image data at the edges to produce a more natural look to the combined image.

Figure 5:
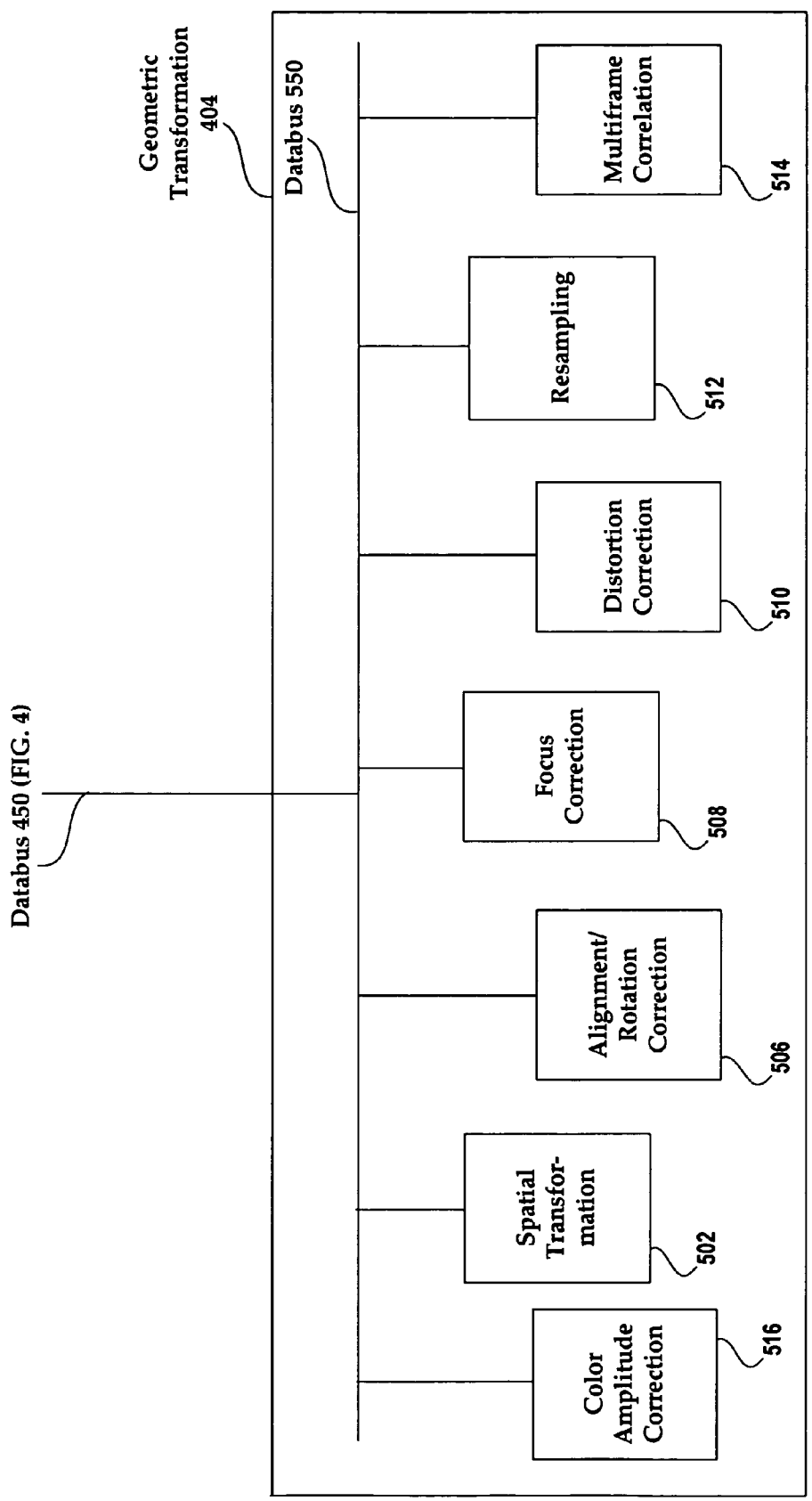
FIG. 5 is a block diagram of one embodiment of the FIG. 4 Geometric Transformation 404 in accordance with the invention.

FIG. 5 is block diagram of Geometric Transformation 404 of FIG. 4 and includes image processing modules for Spatial Transformation 502, Alignment and Rotation Correction 506, Focus Correction 508, Distortion Correction 510, Resampling 512, Multiframe Correlation 514, and Color Amplitude Correction 516 all interconnected via a common databus 550. These processing modules, although they are shown as separate blocks, can be embodied by a single programmable processor performing the functions of the various modules. As will be discussed further in relation to FIG. 7, these functions may also be performed by a Graphics Processor Unit (GPU) as part of a System-On-Chip (SOC) implementation that may also encompass other modules of the DIP 210 and DOP 230.

In the FIG. 5 embodiment, Spatial Transformation 502 redefines the spatial relationship between image pixel points. Spatial Transformation 502, for example, in an X-Y alignment in a projection system with three image modulators 244, allows each image modulator 244 to have extra pixel rows and columns. Spatial Transformation 502 then digitally adjusts the image pixels in the X-Y plane and writes the adjusted pixel data to image modulators 244. For example, if the pixel adjustment is by an integer, Spatial Transformation 502 shifts the old imaging pixel address by the integer number of pixels to adjust. However, if the adjustment is by a non-integer then Spatial Transformation 502 resamples the image with a weighted filtering algorithm to acquire new pixel values. Spatial Transformation 502 also deals with one-dimensional skew, tangential symmetry, aspect angle, and scale related distortions of image modulator 244. Spatial Transformation 502 uses resampling and weighted filtering algorithms to correct for such distortions on a pixel line by pixel line basis. Spatial Transformation 502 can perform texture mapping as in a traditional 3D rendering process.

In one exemplary system, the Spatial Transformation 502 utilizes a pixel center point translation to determine which source pixels are used to create a new output pixel, what the weighting of the difference source pixels is and what shape of filter is used to create the ideal output pixels. Such a scheme can be used in a lower cost system where the DM 402 information is directly accessed from flash memory and combined with the incoming pixel data to produce output pixel values that have be appropriately transformed based on the shape of the projection distortion. Such a system can be designed using line buffer memory so that no external memory is required. Such processing could also incorporate all of the complete geometric transformation 404 processing steps for a low cost system.

Spatial Transformation 502 may also be used to perform scaling and format conversion. One technique is to utilize data from the image subbands, which are already scaled versions of the input image and are typically twice the resolution of the next subband. There is also potentially an image superband with twice the input resolution. For any (within the practical limitations of the hardware) desired output resolution, there is an image subband with lower (or equal) resolution and an image subband or superband with higher (or equal) resolution. Using the two bounding images, the Spatial Transformation 502 may perform a weighted and filtered interpolation between the bounding images to arrive at an output image with the desired resolution. This use of the bounding images as input images is also a preferred mode for the Alignment and Rotation Correction 506, Focus Correction 508, Distortion Correction 510, Resampling 512, Multiframe Correlation 514, and Color Amplitude Correction 516 operations described below.

The Spatial Transformation 502 may also be used for more complex format and aspect ratio conversion techniques including anamorphic (parabolic) scaling and region based anamorphic scaling for performing non-linear conversion of content from an aspect ration of 4:3 to 16:9. A conversion can treat the 4:3 content as different zones where the center zone is linearly scaled and the left and right zones are scaled using anamorphic scaling which increases the scale factor as the image gets closer to the screen edge. This technique is useful as the center viewing area will have the least scaling distortion and presumably most of the scene information is primarily kept at the center of the image. This type of scaling may either be performed as a separate operation or as part of the overall geometric transform using the tessellation mapping. In the case of combining with the tessellation mapping, the triangles in the left and right zones are formed not just to correct for the projection distortion, but to also include the non linear scaling.

The use of two times resolution increments for the subbands and superband is based on the need for an interactive 3D system to cover a large variation of user perspective on any given scene and thus the need to have different textures for views very close up, very far away and from many different angles. For a Rear Projection Television (RPTV), the viewing angles and viewing distances are related to the internal design of the projection path. As such, the projection path is more fixed and will not have the same large variations as an interactive 3D system. Therefore, two times resolution increments for the subbands may be a poor choice and a much smaller increment will give better results when used with the texturing procedures. For example, based on the worst case image distortion path, it may be advantageous to have the first subband of the original image be twenty percent smaller than the input image. The second subband may be chosen to be twenty percent smaller than the first subband. Similarly, the superband may be chosen to be twenty percent larger than the original image. The sizing of the bands and the texturing algorithm are mathematically related such that a system needs to be designed or programmed to account for the relationship between the subbands.

Alignment/Rotation Correction 506 deals with two dimensional skew, tangential symmetry, aspect angle, and scale related distortions of image modulator 244. Alignment/Rotation Correction 506, for each R, G, and B color component, uses resampling and weighted filtering to reposition pixels in the both horizontal and vertical directions so that, when output, each color component is positioned in the proper locations across the entire image. Alignment/Rotation Correction 506 also repositions pixels to rotate display images. Alignment/Rotation Correction 506, to correct rotational misalignment for three image modulators 244 or geometric distortion from lenses, performs a geometric transformation to pre-compensate the images.

Focus Correction 508 improves non-uniform defocus, including defocus introduced by image modulator 244 optics. Focus Correction 508, to account for focus problems of display screen 260, preferably filters the image to pre-compensate the digital data representing the image. If a display screen 260 area, because of the non-uniform projection path, has more image modulator 244 pixels than display screen 260 pixels, then Focus Correction 508, on a single frame basis, uses noise filtering techniques to apply linear filters, nonlinear filters, and adaptive filters. Focus Correction 508 additionally uses techniques based on POCS or other adaptive filtering techniques to pre-compensate for anticipated focus blurring. In contrast, if the display screen 260 area has fewer image modulator 244 pixels, because of the non uniform projection path, than display screen 260 pixels, Focus Correction 508 uses convolution techniques or reverse filtering techniques to perform edge enhancements to pre-compensate for the pixels being spread out and the image being blurred during projection. The spatial spread of the image due to the display system is characterized as the display system Point Spread Function (PSF).

Distortion Correction 510 corrects image distortion, including keystone effects. Distortion Correction 510 provides each image with a scan line having a different scale factor to precompensate for projection distance differences. Distortion Correction 510, starting from the upper portion of the image, filters the image by permitting the image to use fewer pixels on image modulator 244, so that, when projected, images on screen 260 will be proportioned properly.

Distortion Correction 510 also corrects for radial distortion introduced by lens systems. In regions where radial distortion increases the pixel density of display screen 260, Distortion Correction 510 uses a spatial filter to reduce any differences between neighboring pixel values. Consequently, the corresponding image is smooth and does not contain artifacts, including high frequency artifacts. For screen display 260 regions that have fewer pixels than display screen 260 pixels, Distortion Correction 510 uses a filtering technique to perform edge enhancements which increase differences between neighboring pixel values. This pre-compensates for the PSF distortion which will be introduced during display when neighboring pixels are spread out. Consequently, images that would have had sharp edges are smoothed out by the display process to have a more uniform appearance. Distortion Correction 510 preferably acquires specific distortion patterns from DM 402.

Resampling 512 translates the pixel values from high resolution grids to new pixel values on image modulator 244 grids. Multiframe Correlation 514 improves multiple frame display quality. Multiframe Correlation 514 uses algorithms such as Wiener deconvolution to exploit the temporal correlation between frames. Multiframe Correlation 514 uses multiframe techniques that process more than one input image frame to construct an optical flow field, which is further processed to construct output frames. IR 318 can provide frame inputs to Multiframe Correlation 514. Alternatively, these frame inputs may be part of the compressed data input to Compressed Input Control 312. Multiframe Correlation 514 can use Bayesian filtering or POCS techniques to extract multiple frame information and motion vectors showing relationships between frames from a compressed bitstream.

Multiframe Correlation 514 also converts an input frame rate to an output frame rate, for example, from 24 frames per second (fps) to 60 fps. Multiframe Correlation 514 thus, from the sequence of 24 input frames, generates 60 unique and distinct output frames wherein all moving objects are motion-compensated so that, at the time when they are displayed, they are at the proper spatial coordinates. Information for generating proper output frames results from the input frame, motion estimation information, and object motion prediction. Motion estimation information is either part of the compressed input bitstream or generated by Motion Estimator 3180 during image input processing.

Color Amplitude Correction 516 is used to correct for the non-uniformity of color intensity across the display. For example, the light path in an RPTV may be such that the light source is brighter at the bottom of the display screen than at the top of the screen and if not compensated for, the displayed image would not look particularly good. During a setup mode of the system, the information relating to the brightness for each color component at each location on the screen can be measured and stored. This information can be used either on a per pixel basis or used as part of tessellation map generation where each vertex of the triangle is assigned a color adjustment value for each color component. These color adjustment values can then be used by the Color Amplitude Correction 516 to compensate for the brightness of each color component at each pixel. This may be done by either using the per pixel stored information or by using the per vertex information and performing some type of interpolation to determine the values between the vertices.

Display Modulator (MLC) 420 preferably receives DOP 230 processed output data, and controls sending of that data to image modulator 244. DM 420, to prevent tearing within an image frame, may include control for timing updates with respect to the display timing. DM 420 outputs may be analog but preferably are digital and include separate data and control signals for each R, G, and B color component which may be 6 bits, 8 bits or more. For TFT displays that include column drivers, DM 420 outputs, for example, can be on one or two 24-bit digital busses, based on 8 bits per component, that drive a raster scan. Alternatively, DM 420 may use voltage or frequency modulation techniques for outputs to drive image modulator 244. DM 420 outputs, for a flat panel display, include row and column drivers, and for each active matrix TFT, passive matrix LCD display, or other display type that requires them, include voltage level specifications. Prior to modulating images, DM 420 determines the simplest way, the frequency, and the values representing the data to be written to image modulator 244. DM 420 uses TGP 412 and RSR 414, which include both compensation for the time response associated with image modulator 244 and an algorithm that increases the display update rate (or refresh rate), to increase the perceived resolution of image modulator 244.

The traditional backlight design goals of creating the most uniform single backlight source are different than the goals for ideal embodiments of this invention. In addition to having the ability to produce a uniform backlight when needed, preferred backlight embodiments of this invention also include much finer granularity for control of backlight elements along with the correlation information as to the regions of the screen that are effected. Lumileds Lighting, U.S., LLC Application Brief AB27 published January 2005 "For LCD Backlighting Luxeon DCC" page 7 shows an LED light source for a 15" display following a path through a 90 degree coupling mirror, a mixing light guide, 180 degree coupling mirror, and finally the main light guide to produce a back light that meets the chromatic and luminance requirements. The use of the light guides along with the diffuser films, BEF film and coupling mirrors represent an alternate configuration for an LED backlight configuration. While this waveguide approach produces a very uniform backlight, it typically has poor region based controls. To utilize the embodiments of this invention along with a waveguide configuration, multiple waveguides may be required where each waveguide contributes the light source to a region of the display. Alternatively, the individual LEDs of a single waveguide can be characterized as to which regions of the display they most affect.

Figure 6:
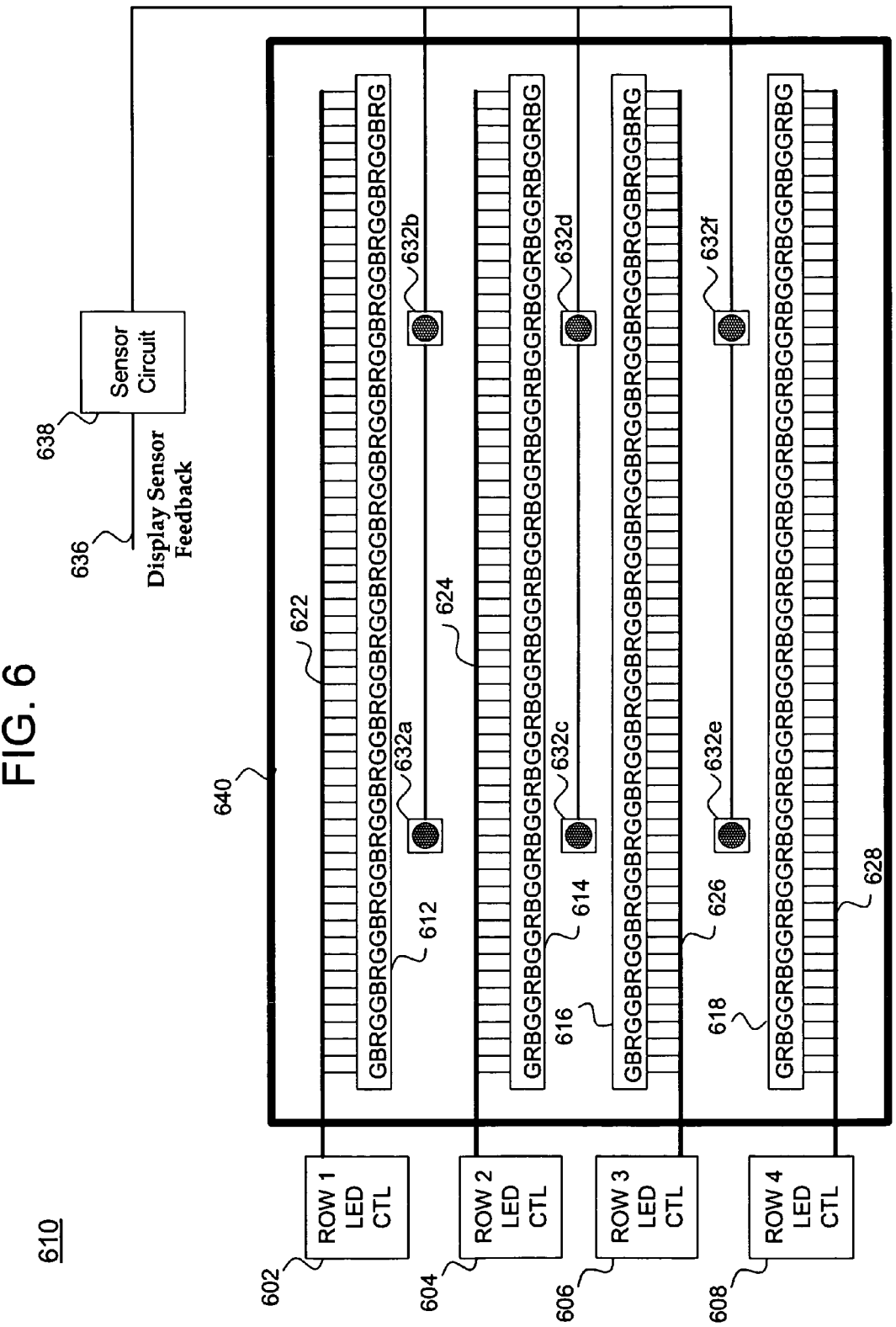
FIG. 6 is a block diagram of an LED based backlight system for a Flat Panel Display including light sensors for feedback.

FIG. 6 shows in block diagram form a three color LED back light system 640 for a flat panel display. System 640 shows four rows of LEDs 612-618 with individual LEDs having controls via respective buses 622-628. Though shown in rows for simplification of the illustration, a preferred embodiment of this invention would arrange the LEDs in a staggered pattern or in a hexagonal, octagonal or other polygonal grid in order to improve the light patterns produced by the LEDs. The grid points could be either individual LEDs or clusters of the multicolored LEDs that make up each pixel. Side emitting LEDs or LEDs with a diverter may be used to prevent undesirable color spots on the screen. The sensor placement would vary based on the specific placement of the LEDs, but the general concept for achieving the sensor feedback and LED processing remains the same. In the case of a polygon LED configuration, the sensors could be centered within each polygon.

In a preferred embodiment, the brightness of each LED is individually controlled via the row LED controls 602-608 over individual control lines which make up the busses 622, 624, 626 and 628. Other systems may control the LEDs in either groups or clusters based on some combination of location and color. Row 1-4 LED controls 602-608 receive commands from MLC 420 and, depending on the type of LED, the brightness control may be based on varying voltage, current, pulse width modulation or some combination of the three. While FIG. 6 shows a repeated sequence of green (G), blue (B) red (R), green (G), different patterns and different colors may be used where the objective is the ability to display a full color gamut. In this example, since current green LED technology does not achieve as high an output as red and blue, the number of green LEDs is doubled. In another system, a fourth color (wavelength) LED would be used instead of a second green LED.

As indicated with FIG. 6, when the display modulator, such as a TFT panel, is in position over the lighting system, a large number of display modulator pixels are affected by each LED and each modulator pixel may be affected by several LEDs. The relationship between the LEDs, the modulator pixels and the display screen may be described by a Point Spread Function (PSF). There will typically be some type of diffusion film between the LEDs and the display modulator to reduce the potential for bright spots from the LEDs as well as to even out the light source overall. The LEDs would typically be mounted onto a Printed Circuit Board (PCB) and there would be some type of reflective material placed on the LED side of the PCB to help harness and direct the LED light towards the panel. The row 1 control 602, row 2 control 604, row 3 control 606, row 4 control 608 and the sensor circuit 638 need to be physically out of the way of the light path from the LEDs to the TFT panel and could be located on the back of the PCB or under the bezel of the display.

Included as part of LED back light system 640 are a variety of sensors 632a-632f. The sensors may include detection for brightness and for wavelength. The sensors may be positioned at various locations within the display and may either detect the LED light directly, or through a diffusion filter that is part of the flat panel display. In one embodiment of this invention, each LED may include a sensor either externally, as part of the LED packaging, or as part of the LED fabrication. The sensors may require sampling and conversion circuitry that may either be integrated into the sensor or may be a separate circuit, such as sensor circuit 638. The display sensor feedback path 636 is used to feed back the sensor data to the sensor input 426 which is part of DOP 230.

The sensor feedback information is processed to determine the characteristics of the various LED light sources with respect to brightness and color (wavelength) and further processing calibrates the display. The LED characteristics may change with temperature as the electronics heat up and as the LEDs age which changes the PSF. Another important aspect of light sources is to maintain the proper white balance of the system where the various wavelength LEDs are in balance with respect to the desired color temperature. The processing circuitry for the sensors may be shared where multiple sensors would share the circuitry over time. For example, the sensors may output an analog signal and the circuitry would perform analog to digital conversion. Even in the case where there was a sensor for each LED, the circuit would be shared for the analog to digital conversion. It would not typically be necessary to calibrate all of the LEDs simultaneously, though it may be convenient to have several sets of sensor circuitry so that the sensor information from more than one location could be used to determine the LED characteristics for a given set of inputs.

As in FIG. 6, when the sensors are placed at various locations within the display, but there is not one sensor per LED, it becomes more difficult to determine the characteristics for any given LED. Other systems such as OLED and NED based systems, where the light source is included as part of each pixel component, may also include a sensor for each pixel component. The sensors for each pixel component may include just the sensing element where the conversion and sampling from the sensing element to usable data (such as analog to digital conversion) may be performed in one or more sensor control circuits that are shared between the pixel component elements. The discussion below is focused on the LEDs, but could easily be applied to OLED, FED, NED or other light sources.

Two methods for characterizing LEDs are through a diagnostic mode and through run-time sampling where actual display data is being displayed. In a diagnostic mode, all of the LEDs could be turned off except the LED-under-test. The LED-under-test could be sequenced through its different levels and the sensor would record the values at each level. For example, if an LED had 16 brightness levels, the LED would be set to brightness level 1 and the sensors in range of the LED would record the color and intensity levels. The brightness level would then be changed to 2 and the LED would record the color and intensity levels for level 2. This process would be completed through all 16 brightness levels and a response table for the LED could be stored. The procedure would than be repeated for each LED in the system. Combined with the information on the relative positions of the LEDs and the sensors, a complete calibration of the flat panel lighting system can be performed in this way. Some systems may include a temperature sensor to further calibrate the display based on the temperature. Other systems may also include sensors for measuring ambient light conditions that can affect the display appearance.

While at the factory or during maintenance of the display, a diagnostic mode is possible. However, in normal operating conditions, such as in the application of a consumer television, it is not always possible to perform such a diagnostic operation. For a consumer application such as a television system, such a diagnostic mode could be hidden in the operation of the television. For example, if a television is on for more than an hour, the LEDs are presumably operating at normal operating temperature. When the consumer turns off the television, the LED diagnostic mode could be performed. With the TFT or LCD screen turned off, such an LED diagnostic mode could be run with minimal annoyance to the consumer and unless the room was darkened, the consumer may not even know such a calibration took place.

However, in some applications, a digital display may seldom, if ever, be turned off and it would not be possible to perform such a diagnostic mode in normal operating conditions. For example, if the display is part of kiosk in a hotel or airport it may be left on for months or years. In such a case, it becomes necessary to perform the LED characterization using the operating stimulus that is part of the display operation. The MLC 420 circuit knows what outputs are being driven to the display light controls 602-608, and can track and compare the driven outputs and the corresponding sensor data. Such a feedback system, where the sensors record the light and color and correlate it back to what the LEDs were set to, could be operated regardless of LED output settings. Alternatively, the system could detect predetermined LED conditions that would occur naturally during display operations and only record the sensor data at those times. Some applications, such as a kiosk that continuously shows a schedule of flights at an airport, would only have a limited set of colors displayed so a chosen predetermined LED condition may never be met. Therefore, a system that utilized a technique for detecting pre-determined LED conditions may also need a mode for recording sensor readings for whatever the LED settings happen to be.

In addition to testing and characterizing the color and intensity levels for the LED outputs, it is advantageous to characterize the real time response characteristics for the LEDs. A preferred embodiment of this invention utilizes the speed of the LED transitions to compensate for the slower color transitions of the display modulator itself. A sensor can be set to record the transition speed between various output levels of the LED to characterize the speed of the LED. This information can be utilized to better match the driven output levels for the LEDs when performing response time compensation. As dictated by Nyquist sampling theorem, a given sensor and the circuitry for converting the sensor data to a digital value needs to operate at at least twice the speed of the output toggle rate for the LED. As described above, the LED response time can be measured either as part of a diagnostic mode or during normal operating modes using the patterns that are part of the input data stream.

The DOP 230 makes use of processed sensor data as part of the various block functions including DM 402, SGP 408, TGP 412 and MLC 420. In one embodiment of the current invention, the sensor data can be used to adjust or override the DM 402 information that is stored for each pixel. The SGP 408, TGP 412 and MLC 420 would then utilize the updated DM 402 pixel information with regard to color and intensity to adjust both the display modulation controls as well as the light source controls. In another embodiment, the sensor information would be stored in the memory 424 and each processing block would utilize the information while performing the various processing steps. In both cases, the spatial and temporal characteristics of the LEDs and the display modulator are utilized by the SGP 408 and TGP 412 processing units such that the MLC 420 is able to drive the appropriate values to the LEDs and the display modulator array. Additionally, the combination of processing the image content and driving the display modulator and LEDs can be used to produce a higher quality display output. In a preferred embodiment of this invention, the expanded dynamic range enabled by controlling the LEDs it utilized to achieve a higher quality image than what would otherwise be possible with a single light source and image modulator.

The processing for the LED control is performed spatially and temporally. Spatial processing is performed both for the LED array and for the display modulator pixels based on the incoming display data and the other display characteristics. There are several ways to perform the spatial processing for the LED PSF. One method is to filter the display image down to the approximate resolution of the LEDs and use that as a basis for determining the LED brightness levels. Similar to wavelet decomposition where an image is filtered to a lower resolution, the image can be filtered with a variety of filtering algorithms. Though the LED array of FIG. 6 could be considered to have a resolution of 60 horizontally and 4 vertically, the spacing of the rows and the overall PSF need to considered as part of the filter design. Additionally, in order to achieve the required brightness for the brightest pixel, the LEDs that affect that pixel may be required to be lit at a higher level than an average weighting filter would otherwise conclude. Sophisticated filtering techniques may be used to determine the best LED values.

For example, the modulator image can be filtered from an original display resolution of 1920×1280 to a 60×4 representation of the image that matches the resolution of the LEDs. The LED colors could be considered prior to the filtering, during the filtering or extracted after the filtering. The filter coefficients can be used to approximate the relative influence that the LEDs have on the display modulator with a particular weighting to the pixel values that require the highest brightness. There is no point in using the values from display modulator positions to determine an LED value if that display modulator position is not effected by the light from that LED so the cutoff for the filter range may be very sharp. In a simplified filter design, the region of pixels effected by an LED or group of LEDs is scanned and, based on the highest values for red, green and blue for those pixels, the brightness levels for the red, green and blue LEDs are set accordingly. Other types filtering techniques may be used and may start from the original image data or from a filtered subband of image data.

Note that only once the LED values for a given region of the display are determined can all of the image modulator values for the pixels in those regions be determined. An image processing system may choose to do the full screen analysis on the image frame data, determine the LED brightness settings and then determine the image modulator data values or perform the processing on a region by region basis. Temporal processing can be included in these steps as the data from the prior frame is available in a memory buffer and can be used to calculate the LED brightness settings and the image modulator data values. Performing the full screen analysis will add a frame of latency to the system. For many types of television and other systems, this frame of latency is not problematic. Systems that seek to perform multi-frame temporal gamma correction may add an additional frame of latency such that performing the full screen spatial processing is not an issue. However, for display systems with more interactive requirements, such as some computer applications or game machines, adding a full screen of latency may not be acceptable.

For such latency sensitive applications, instead of performing full screen analysis, the analysis could be done based on a limited number of rows, referred to as a slice. Row based processing is used because of the scan line nature of video and displays. Considering the LED configuration of FIG. 6 where there are four rows of LEDs, since the first row of LEDs would typically not effect pixels that are not in the top one-third of the display, the analysis for determining the LED brightness values for the top row could be performed from the slice of data values from the top one-third of the screen. LEDs or clusters of LEDs arranged in staggered rows or hexagonal patterns would similarly affect the rows of display data based on the spatial distribution of the light sources relative to the display pixels. Once those LED values had been calculated, the LEDs could be ramped up or down to the appropriate level when the pixel modulator values were being scanned out to the image modulator. Display slices corresponding to LED rows 2, 3 and 4 could be performed in a similar manner and pipelined such that the overall latency added to the system was one-third of a frame, not a full frame. A more aggressive approach could determine the LED values based on even less of the display data rows and could lower the latency further though the best values for the LED and pixel modulator may be slightly compromised.

In addition to the display light sources 270 that are modulated as part of the display, additional light sources may be controlled by DOP 230 that affect the ambient lighting around the display. Ambient lighting affects how the viewer perceives the display image and can enhance the overall viewing experience. Viewers can experience eye strain due to the normal brightness changes that happen from scene to scene. The same physiological effects that cause eye strain can also diminish the eye's ability to perceive image detail and dynamic range. In order to combat these effects, display system 240 may produce ambient light where the ambient light may be single colored or multicolored and may vary in color for different areas around the display. In one embodiment, the display light sources 270 are used in the ambient light generation and in another embodiment dedicated ambient light sources (not shown) are used.

In one preferred embodiment, an ambient lighting system illuminates the area, typically a wall, behind the display screen with colored light where the colored light emanating from the edge of the display is of similar color to that of the display screen at the corresponding edge of the display. The visual effect of such a system is to extend the display image beyond the display boundary. The brightness of the ambient lighting is based on both the light intensity of the display image as well as the natural ambient light in the display environment. The illumination around the display reduces the eye strain of the viewer and can allow the viewer's eyes to more readily discern the display quality that is produced on the display screen. Another benefit to illumination is that the display image may appear larger to the viewer because the extended illumination area, though not containing actual display pixels, is perceived to be an extension of the display area.

For display systems that are mounted on a wall, the illumination may extend from all four sides of the display. For floor standing display systems, the illumination would likely extend in the three directions (right, left and above). For flat panel display systems using LED light sources, additional light sources may be placed within the housing of the display and directed through diffusing materials to provide the illumination around the display. The more light sources that are spaced around the housing of the display, the smoother and more controlled the dynamic ambient light can be. Rear projection systems that utilize geometric transform based image pre-compensation may also be small enough to be wall mounted. These rear projection systems typically have a sophisticated lens and mirroring system that may be enhanced to reflect a portion of the lighting used for the display lighting to be diffused and provide the dynamic ambient lighting around the display.

Much as home theatre systems include surround sound systems where there are speakers placed at the sides and rear of the audience, a surround lighting system can be designed to include dynamic ambient lighting for the home theater system environment. Filling the periphery of the viewers' field of view with controlled ambient light sources may significantly improve the overall viewing experience for the audience even though the actual display pixels may not change. The DOP 230, when calculating the image modulator 244 and display light sources 270 values, may also calculate the color and intensities for these dynamic ambient lights. The actual controls may be either part of the DOP 230 output control system, or an additional control system may be added to the display system 240. In one preferred embodiment, some of the dynamic ambient light sources may be controlled from a wireless control signal generated by the display system 240 and received wirelessly by a remote dynamic ambient light source. The dynamic ambient light sources may use any type of light source and may be simple lights, lights with color filters or multi colored light sources. In a more complex system dynamic ambient lighting may be generated by a projection system using a multi color light source and its own image modulator or by some type of projection lights resembling stage lights or night club canned lights.

Figure 7:
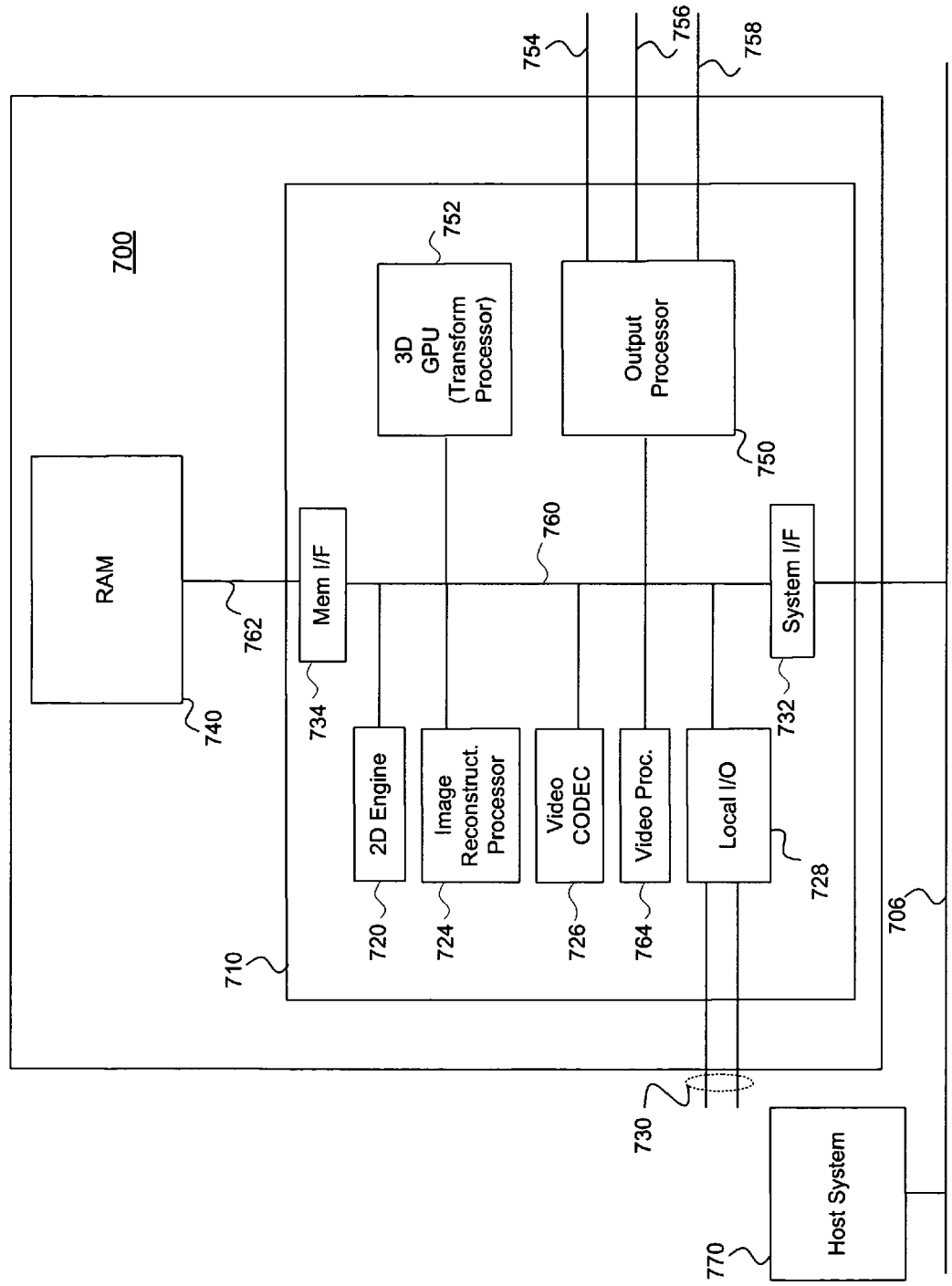
FIG. 7 is a block diagram of a System-On-Chip embodiment combining various video and graphics processing with display processing and the light source processing.

FIG. 7 shows a System-On-Chip (SOC) alternate embodiment 710 for performing overall operations like those described in relation to the DIP 210 and DOP 230 processing modules. RAM 740 can provide storage similar to the Buffer Memory 308 and 424 as well as memory buffers associated with each processing module of the DIP 210 and DOP 230. FIG. 7 also shows a Host System 770 which may include a main system processor and provide other host services including managing connections to various digital networks. There are many ways to partition the system including integrating the processor of the Host System 770 onto the SOC 710 as well as not including some of the functional blocks shown within SOC 710. In one preferred embodiment, a graphics controller normally used for 3D graphics is used to perform the geometric transform and texture mapping functions for the display warping and image filtering.

The FIG. 7 system includes a main system Bus 706 which connects the SOC 710 to the Host System 770. In another system (not shown), the host system may be an integrated part of SOC 710. The System Interface 732 manages communication between the various processing elements and the main system Bus 706. Compressed image data may be carried on either the main system Bus 706 or on Local I/O buses 730 managed by the Local I/O controller 728. The local I/O buses 730 may also include various other analog video connections (S-Video, composite video, component video), connections to analog decoder chips ("CCIR-656," DVO or SDVO) or connections to sources of digital uncompressed data (SDVO, DVI, HDMI, LVDS, PixelPort). Local I/O buses 730 may also include inputs from various light and environment sensors providing measurements which are used in the processing of the display data.

The complete subsystem 700 for SOC 710 also includes RAM 740 which connects over memory bus 762 to the SOC 710. SOC 710 may also include various on-chip memory subsystems, but it is typically most cost effective to also include an external RAM 740. Memory bus 762 is controlled by the Memory Interface 734 which may have connections either directly or over an internal bus 760 to the internal processing modules. RAM 740 may be used for storage of the tessellation map data, the input image data, the processed image subbands, the processed image superbands, the display surfaces that make up the frame output, and various other intermediate, temporary and past data.

The Output Processor 750 has output busses 754, 756 and 758 for directly interfacing to an image modulator and potentially one other type of display output (not shown). The outputs 754 and 756 will have the proper configuration to fully control the image modulator or a set of image modulators, and output 758 includes any necessary light source control. The output 754 may be a "Monitor Out" capability which outputs a more standard HDMI, Pixel Port, Component Video or other type of signal for use by another video device. In such a case, the Monitor Out needs to provide a standard video output signal that may include various image quality enhancements, but will not include any of the specific warping or image modulation techniques that would make for a non-standard output. The display output 756 can be used for a second type of display which may include a different set of processing steps specific for a Rear Projection Television (RPTV) system or a Flat Panel Display (FPD) system. For an RPTV, Output Processor 750 may control an image modulator subsystem based on a Digital Light Projector (DLP) or LCOS (Liquid Crystal On Silicon) microdisplay. The output 756 for the microdisplay subsystem would include all of the warping and processing steps for the RPTV main display. Another type of system could utilize both outputs 754 and 756 to control a special 3D, curved or multisurface display device.

Output Processor 750 may also control special FPD capabilities via output 756 to an image modulator and via output 758 for light source control. Image modulation techniques and light source controls, such as those described in connection with FIG. 4 SGP 408 Temporal Gamma Processing 412, Reverse Super-resolution 414 and MLC 420, may also be performed by Output Processor 750. The color enhancement techniques previously described may also be performed where both the image modulator and the light sources are controlled to enhance the display image. Enhancements may also be included to support High Dynamic Range (HDR) displays which expand the color gamut and dynamic range beyond the traditional color values.

Since SOC 710 enables tight communication between the Image Reconstruction Processor 724 and the Output Processor 750, additional processing based on the compressed domain input data may also be utilized to enhance the display output. Such additional processing may be based on wavelet input data, motion vectors for temporal data or error terms of compressed data. Additional adaptive algorithms may be included to enhance dynamic range within various display regions and may also utilize motion compensation. Support for other industry efforts for accurate color representation and such efforts as Microsoft and HP's RealColor digital color control can be provided within the control system either with or without the particular display device including native support for such efforts.

The Video Processor 764 can perform various processing steps associated with video data which may include de-interlacing, image processing, color space conversion from YUV to RGB, enhancing color gamut, enhancing the dynamic range and other related operations. The Video Processor 764 may decompose subbands to generate scaled and filtered image data and, in a system without an Image Reconstruction Processor 724, may also generate the image superband. Similarly, in the absence of a dedicated Video CODEC 726 or for CODEC formats not otherwise supported, the Video Processor 764 can perform the steps of decompressing and compressing video data. As with the other processing blocks of FIG. 7, Video Processor 764 may include line buffers or memory caches. An image superband or other enhanced display image may be used by the Display Output Processor 750 to determine how to best expand the color gamut and dynamic range to portray an image with the perception of a resolution even higher than the image modulator would otherwise be able to support. Use of such processing takes advantage of the neural processing of the human eye and brain which can be tricked into perceiving high dynamic range as higher resolution.

The Video CODEC 726 is a functional block that performs more dedicated functions of decompressing, compressing, transcoding and transrating video bitstream data. For standards based systems, such as those designed around MPEG-2 or MPEG-4, it is often most efficient to include a dedicated Video CODEC 726. While transcoding and transrating would typically be performed within a Video CODEC 726 or Video Processor 764, the steps of fully decoding and then encoding may also encompass operations on the decoded frames performed by other functional blocks within the system. For example, the 2D Engine 720 may perform the operation of overlaying a menu system over a decoded MPEG stream which is then re-encoded to combine the MPEG video along with the menu system information. In another embodiment, transcoding and transrating can be performed by Video CODEC 726 or Video Processor 726 with the data in the compressed image domain where the bitstream does not need to be fully decoded in order to be recoded at a different bit rate, different resolution, different frame rate or some combination of the three.

The Image Reconstruction Processor (IRP) 724 is used to enhance the image quality, resolution, color gamut or dynamic range for the different video inputs. As with the Image Reconstruction 318, this SOC 710 is advantageous over prior art systems which use super-resolution techniques for generating only high-resolution still images from a video sequence, but not for generating real time video output images including image subbands or image superbands. The multiframe resolution enhancement techniques of IRP 724 can also be used to generate an image superband that represents the input image with higher, typically double, resolution of the input data. The super-resolution techniques used by the invention depend on a high correlation of the data between frames, and require a sub-pixel shift of the input images which is typical based on the movements of objects in the video image sequence. IRP 724, in correlating images to reconstruct output frames, uses motion vectors provided by a motion estimator within the IRP 724 or by processing motion vectors included the input bitstream.

In SOC 710 the image superband along with the image subbands can be directly used by the 3D GPU 752 as it would with other multi-level texturing modes. The superband may also be used by the Output Processor 750 to determine the desired output image which may then be generated using various color gamut expansion, HRD and advanced modulation techniques for controlling the image modulator and light sources. One of the subbands of data may be used by the Output Processor 750 as the source data that is filtered to produce the light controls for the LEDs. Since the resolution of the LED array is typically lower than the resolution of the subband, additional filtering may be needed to determine the LED levels.

For images provided as compressed bitstreams such as MPEG-2 and MPEG-4, IRP 724 may also perform noise reduction filtering and color enhancement adaptively based on the motion information within the bitstream. Recalling MPEG uses predictive techniques to code macroblocks with respect to a reference macroblock producing motion vectors (called motion estimation) and error terms (the macroblock content difference). By the nature of compression, some of the information from the original image is lost during the predictive encoding. Examination of the motion blocks and error terms by the IR 724 allows an understanding not just of the motion information, but also of how much quantization was performed which is an indicator of how much color information was lost.

Understanding how the human visual system perceives the combinations of luminance, color, images and motion, allows the IRP 724 functions to best recover and enhance the image. For example, in moving images the eye is less sensitive to colors so color enhancement is less important. Where there is less motion, enhancing the saturation and hue of the image is more desirable. Where there is more quantization, more color information was likely lost and the hue and saturation for colors in those blocks should be further enhanced through gamut expansion. Additionally, the use of higher dynamic range at the outputs can trick the eye into perceiving higher resolution. In general, such algorithms would adaptively vary the enhancement where special care is taken to prevent artifacts that would result from sudden changes in algorithms between blocks in the same image or for blocks within an image sequence.

While the 2D Engine 720 can be used to perform basic graphics data operations such as bit-blit (bit block transfer), color expansion, and line drawing, the 3D GPU 752 performs the more computationally intensive 3D warping operations including the operations performed in the alternate embodiment by the geometric transformation 404. In some systems, the 2D Engine 720 can be designed to perform some of the scaling, stretch blits, color conversion blits and other windowing operations which are particularly useful for multiple video windows. The 3D GPU 752 may include a general purpose programmable engine, dedicated hardware blocks or some combination of programmable and hardwired functions. In general, the 3D GPU 752 performs the functions of the Geometric Transform 404 processing blocks using a variety of hardwired and software driven functions that may include those operations described with respect to Spatial Transformation 502, Alignment/Rotation Correction 506, Focus Correction 508, Distortion Correction 510, Resampling 512, Multiframe Correlation 514 and Color Amplitude Correction 516. In performing these operations on a GPU, some of the functions may be combined into single or multipass GPU functions. The 3D GPU 752 may also perform post transform filtering as part of a later stage of multipass operations.

In a typical interactive 3D application, the 3D GPU 752 is required to operate on different triangle meshes as often as every frame where the tessellation algorithm is continually updated based on movement of objects in the scene or based on movement of the viewer. In a projection television system, since the viewer, screen and projection path of the television remain relatively fixed, the triangle mesh for the warping does not typically change on a frame by frame basis. However, by understanding the limitations of the warping hardware within the 3D GPU 752, and by performing real time analysis of the image data, certain adjustments to the tessellation can be made in real time to improve the image. These adjustments are made to either increase or decrease the triangle size based on analysis of the image content such that the mesh granularity may be increased for areas of the image that have higher frequency image detail.

Another typical operation within an interactive 3D application is MIP mapping, sometimes called mipmapping. MIP comes from the Latin "multum in parvo" which means a multitude in a small space. Used in conjunction with texture mapping, MIP mapping uses multiple images of a single texture map at different resolutions to represent the surface textures based on the viewing distance. Each resolution of the image is referred to as a MIP map level. Whereas a bilinear texture mapping mode uses a single MIP map level, a tri-linear texture mapping uses more than one MIP map level. Anisotropic filtering modes can be either bilinear or tri-linear where tri-linear will typically produce better results. In a typical 3D system, the MIP map levels are generally two times the resolution of the next level. This is to fully accommodate the range of viewing angles and distances required by interactive 3D.

The SOC 710 utilizes processed video image data for the MIP map levels. The various levels can be generated through image subbanding and through image superbanding as described above. The warping of the projection system dictates the effective distortion that needs to be compensated for by the 3D GPU 752. The maximum amount of warping is likely to be significantly less than the full range of viewing angles associated with an interactive 3D system. Because of this more limited warping, using two times resolution steps for the processed video MIP map levels may be a poor choice as the spread between the two levels would not need to be that high. It may therefore result in higher quality output images if the video MIP map levels are much closer in size.

A related issue with typical MIP mapping is that textures may look blurred for triangles that are squished in one direction more than in the other. To overcome this, various anisotropic footprint assembly techniques can be used. These footprint assembly techniques can approximate an elliptical filter and may use multi-texture lookups or other multi-pass techniques. Some techniques also involve the ability to bias the MIP map level that would otherwise be chosen. Other footprint assembly techniques may use a single level texture, such as the single level of the input video image or a version of the input image that has been super-resolution enhanced to a higher resolution, and compute the output pixels from that one image layer. The details and limitations of the anisotropic filtering techniques are taken into account in the tessellation algorithm to better reduce problematic triangle texturing issues.

Another process performed by the 3D GPU 752 is color amplitude correction as in module 516 to correct for the non-uniformity of color intensity across the display. For a 3D GPU 752 based system, this operation roughly equates to the typical 3D operation of providing light sources on a 3D scene. In SOC 710, the color amplitude correction information is included as part of tessellation map generation where each vertex of the triangle is assigned a color adjustment value for each color component. These color adjustment values can then be used by the 3D GPU 752 to compensate for the brightness of each color component at each pixel. This will typically be done by using the per-color component vertex information and performing some type of interpolation to determine the color values for each color component between the vertices.

The 3D GPU 752 may also be used for advanced 2D operations where a more complex format and aspect ratio conversion techniques including anamorphic (parabolic) scaling and region-based anamorphic scaling for performing non-linear conversion of content from an aspect ration of 4:3 to 16:9 is desired. A conversion can treat the 4:3 content as different zones where the center zone is linearly scaled and the left and right zones are scaled using anamorphic scaling which increases the scale factor as the image gets closer to the screen edge. This technique is useful as the center viewing area will have the least scaling distortion and presumably most of the scene information is primarily kept at the center of the image. This type of scaling may be performed either as a separate operation or as part of the overall geometric transform using the tessellation mapping. In the case of combining with the tessellation mapping, the triangles in the left and right zones are formed not just to correct for the projection distortion, but to also include the non-linear scaling.

For systems that utilize LED backlighting, the brightness information for the display locations may either be stored in the form of a vertex based triangle or in the form of a per-pixel-based lighting map. The 3D GPU 752 may utilize the LED lighting information and be based on the distribution of the LEDs, the brightness of the pixels related to the LED positions, the sensor feedback information from the LEDs or whatever other mapping information is available, to process the image frames to compensate for the non-uniformities of the display.

As part of the SOC 710 operations, it may be necessary for video frames to be combined with graphics frames where the graphics frames may be input to the system over one of the digital or network interfaces or the graphics frames may be internally generated by the 2D Engine 720. An example of such a configuration is where a compressed video input stream is provided over a 1394 format connection along with Open Cable Application Platform (OCAP) based graphical information. In such a case, the SOC 710 needs to assure that the video frames and OCAP based graphics are combined for display. Many other system configurations where the video comes into the system independently from the graphics data are supported.

Regardless of whether the graphics frames are internally generated or provided from an external source, the graphics frames will require pre-compensation processing to assure that the output image is properly displayed. This may be done either in conjunction with the video images or independently from the video images and then combined. In the simple case of combining the graphics and video, a masking or overlay operations may be performed where on the basis of each pixel either the video or the graphics information is displayed. A more sophisticated approach of overlaying the graphics with the video uses different levels of transparency. The technique of supersampling and multisampling, where each pixel is divided into subpixels, is used in generating the graphics imaged to implement anti-aliasing. Even in the case where the graphics image has been processed independently for anti-aliasing to avoid jagged edges, the combined effect of the graphics and video may still have undesirable visual artifacts where the graphics and video pixels meet. An improved method for combining the video and graphics frames is for the 3D GPU 752 to perform anti-aliasing which may be combined with texture transparency modes to improve the overall look of the combined video and graphics image. The function of the anti-aliasing techniques is to combine the video and graphics image data at the edges to produce a more natural look to the combined image.

Many of the features performed by the 3D GPU 752 are dependent on both the number of input texture samples utilized and the number of operations performed on both the input samples and on intermediate results. To best support the texture sampling, the 3D GPU may include various buffers and caches for locally storing the input texture samples and the processed intermediate results.

Figure 8:
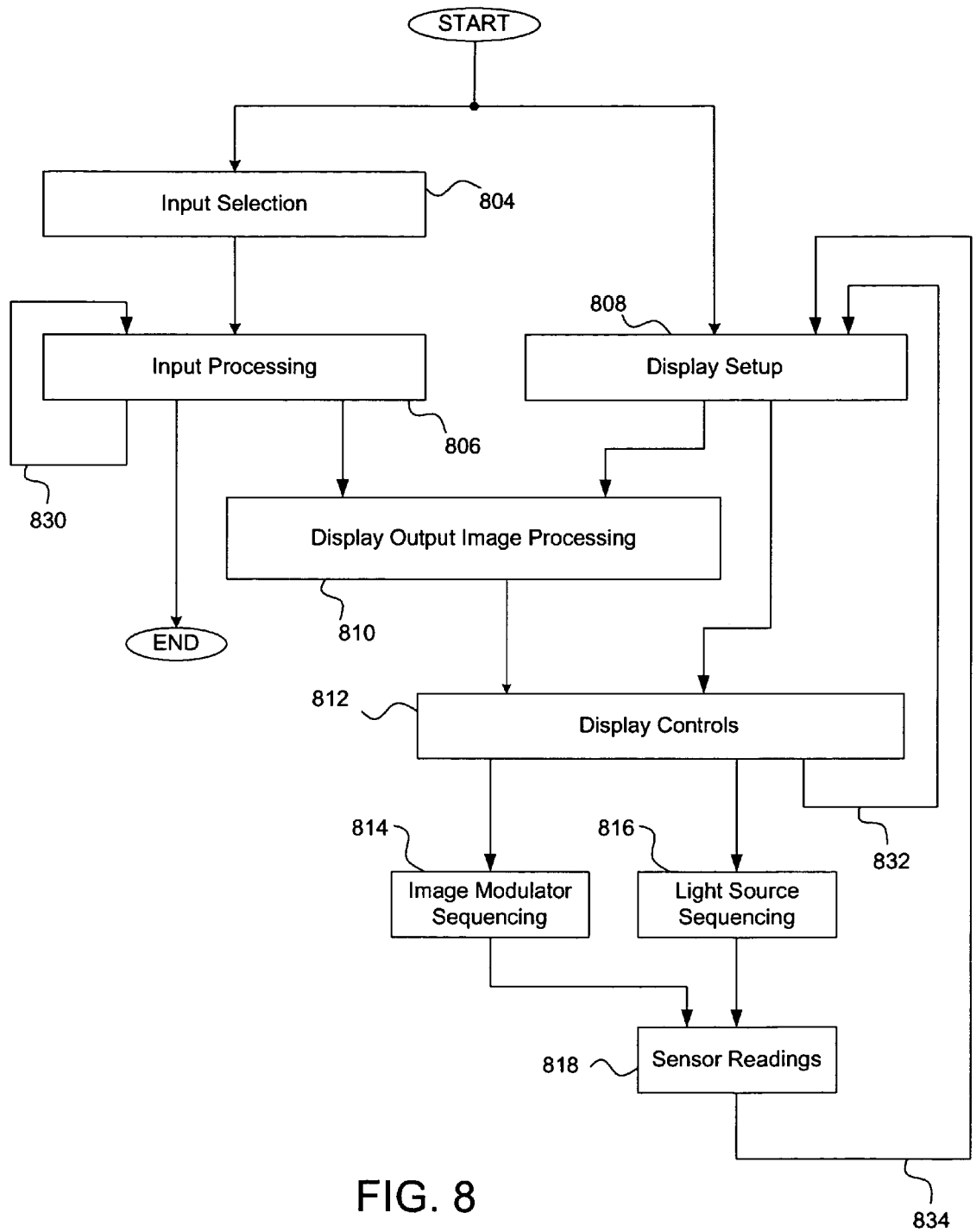
FIG. 8 is a flowchart of steps in a method of processing images in accordance with one embodiment of the invention.

FIG. 8 is a flowchart illustrating the display path from the input through to the image modulation and light source sequencing for one embodiment of the apparatus. Also shown is the display configuration path including the initial display setup as well as the feedback paths for adjusting the configuration. Display setup step 808 utilizes the design and test of the display, the user settings and the feedback from the sensors to characterize the display. Portions of the characterized data may be stored in non-volatile memory, such as flash memory, to be available to the DOP 230 processing. The Display Map 402 (FIG. 4) processing block coordinates the updating of the characterization data when necessary. Some aspects of the characterization data are more temporary and stored in temporary memory which may require DM 402 to process and combine contents of the flash memory and temporary memory. As shown in FIG. 2, display setup step 808 receives feedback from both the sensor readings step 818 and the display controls step 812. By knowing both the display control outputs and the sensor readings, the DM 402 can correlate the real time response of brightness and wavelength for the LEDs.

The steps for each video frame are described from start to output first with respect to the DIP 210 and DOP 230 processing modules, though the individual functions could be performed by other CPUs, DSPs, GPUs or other combined configurations such as those of SOC 710. In step 804, DIP 210, where applicable, preferably selects the desired video inputs. Typically based on the user selection of an input, a microcontroller selects one or more input connections. In step 806, the video input control associated with the connection exercises the Analog Input Control 302, Digital Input Control 304, and Compressed Input Control 312. Analog Input Control 302 converts the signal to the digital domain for further processing by modules 304, 312 and 318, and thereby recovers and enhances, the input images. Each processing module 304, 312, and 318 may preferably format the images and store the intermediate results in buffer 308.

In step 806, Input Processing via Digital Input Control and Synchronization Engine 3040 performs the steps necessary to electrically receive an uncompressed input video stream. If the input stream is protected through encryption, as may be the case with an HDMI input a decryption step is required. Compressed Input Control 312, via Bitstream Engine 3125, analyzes the compressed input streams and selects one or more picture streams for analysis and processing. For quality picture display, Bitstream Engine 3125 records the motion information from the bitstream for use by Image Reconstruction 318. Decompression Engine 3120 preferably uses MPEG-2, MPEG-4 or another decompression step to convert the compressed bitstream into a decompressed and decoded picture. Decompression Engine 3120 can simultaneously decompress more than one compressed picture stream for multiple picture displays including advanced picture-in-picture displays and multi-camera systems. For input data that includes layered coding information, where there is a base layer and an enhancement layer of coded information, Decompression Engine 3120 can decode both layers for use by the Image Reconstruction 318. In the case of a bitstream that has been encoded using image subbands, Bitstream Engine 3125 and decompression engine 3120 maintain the subband information while also providing fully decoded image frames.

Image Reconstruction 318, as part of the input processing step 806, spatially and temporally filters each image frame to reconstruct images. Spatial filtering includes various techniques for noise reduction so that the filtered image does not include artifacts that were not part of the original image. Filtering is preferably applied across the entire input image based on the data values. However, filtering can use additional information, such as spatial position of the decoded macroblocks that are provided by the Bitstream Engine 3125 in cases where, for example, the MPEG data has been decompressed by Decompression Engine 3120. This positional information allows the filter to reduce or eliminate artifacts at boundary edges from the decoded macroblocks while performing the more traditional spatial filtering on the other portions of the image. Other information from the Bitstream Engine 3125, such as the error terms for the macroblocks, indicates how much quantization took place for each block. The IR 318 enhancement steps can utilize this information for noise reduction filtering and any color enhancement processing. Enhancement processing may include expanding the color gamut and the dynamic range of an input image as well as increasing the resolution where appropriate.

Also in step 806, Image Reconstruction 318 performs enhancement filtering that uses information from the Bitstream Engine 3125 and can enhance input image details without amplifying the compression artifacts. Image Reconstruction 318 also performs temporal analysis, which utilizes multiple scenes to filter the images and to record the object motion information, then performs a super-resolution multiframe reconstruction. For each type of input data, super-resolution multiframe reconstruction can be used to create an image superband with higher resolution than the base input image where the created resolution is typically two times the original. This superband of image data can be created from either compressed or uncompressed input data and is used along with the image subband data for providing multi-resolution image mapping capability.

The various image subbands and image superband that have been reconstructed for the highest quality representation are formatted and made available for the DOP 230. Even though the original input images may not have included high dynamic range content or full resolution content, the DIP 210 can enhance the input to create this information. The processing of recovering and enhancing new input images continues via path 830 until the system mode is changed or stopped. If the system is turned off, the input processing step 806 proceeds to the END. While in operating mode, the outputs from the operation of the DIP 210 are provided to the DOP 230.

In step 810, DOP 230 utilizes the DIP 210 output along with the display map 402 information from step 808 to perform Display Output Image Processing. For a projection system, step 810 performs geometric transformation of GT 404 followed by including the module functions of the spatial transformation 502, alignment/rotation correction 506, focus correction 508, distortion correction 510, resampling 512, multiframe correlation 514 and color amplitude correction 516. Geometric transformation can improve display deficiencies related to the display environment, such as may be introduced by FIG. 1B light source 102, light source optics 108, microdisplay image modulator 110 and/or display system optics 112. Geometric transformation can also produce enhanced output images that correct for special environments such as non-uniform light sources, head-mounted, panoramic, and stereoscopic display systems. The spatial filtering techniques of GT 404 can use traditional real-time 3D graphics techniques such as texture mapping and anisotropic filtering to achieve the desired image manipulations.

Step 810 also utilizes processing blocks SGP 408 and TGP 412 to perform the display output image processing for both the display modulator 110 and 130 as well as for the light source 102 and 122. SGP 408 utilizes the input processed display frames from input processing step 806, combined with the processed display setup step 808 to process each incoming pixel to produce the enhanced output for that pixel as well as to determine the appropriate light source contribution for that pixel value. In the case of OLED and FED based displays, each pixel color component may include its own light source as part of the modulator such that SGP 408 produces a combined enhanced sub-pixel value. Since a display output pixel typically considers the triad (red, green, blue) or other combination of color components, each color component for each pixel may be referred to as a sub-pixel.

In the case of an LED backlight system with fewer LED light sources than modulator pixels, the SGP 408 produces both the individually enhanced modulator values as well as the LED values based on multiple modulator pixels. TGP 412 combines with the SGP 408 processing to not only look spatially within a frame for the appropriate enhancements, but to also look across more than one frame to temporally enhance the image processing. A coordinated approach of SGP 408 and TGP 412 to process multiple frames allows the values for the light sources and image modulator pixels to be ideally determined such that outstanding image quality for moving images can be achieved.

When input processing step 806 is able to supply processed images with enhanced resolution or enhanced dynamic range, in step 810 SGP 408 can perform the necessary display output image processing to produce a further enhanced output. Utilizing the human eyes characteristic perceptions to high dynamic range content, SGP 408 may utilize the input data to further process and produce enhanced brightness values of the light sources and modified values for the image modulator pixels. The DIP 210 may also provide a subband of the input image which is at a lower resolution than the main image but at higher resolution than the number of light sources, where the subband is further filtered and processed by SGP 408 to produce the desired light source values for each frame. The desired light source values of multiple frames are utilized by TGP 412 to further enhance the real time response of the overall display. The output of the SGP 408 and TGP 412 is combined for step 812 to produce the actual display controls. In step 812, the Display Modulator and Light Source Controls (MLC) 420 combine the outputs of the SGP 408 and the TGP 412 to produce the controls for the image modulator sequencing step 814 and the light source sequencing step 816. In the case of utilizing a movable modulator, the RSR 414 output is also utilized by MLC 420 to produce the appropriate output display controls. In step 814, image modulator sequencing, the Timing Control (TCON) of the flat panel display scans the row and column image modulator values into the physical modulator. Concurrent with step 814, in step 816 the LED control circuits 602-608 sequence the changes in the LED or other light source to set the appropriate brightness for that frame. Depending on the light source elements, the brightness may be set by varying the voltage, current or Amplitude Modulation (AM) or via Pulse Width Modulation (PWM) of a control signal. In order to best control the brightness of the light source, a combination of AM and PWM may be used. For LEDs, for example, AM may be used to set the white point and PWM used for the real time control.

The light source sequencing may be coordinated with the image modulator sequencing within a frame such that the portions of the screen, or the pixels, where the image modulator values are being updated matches the updated values of the light sources. The time based changing of the light source controls can be further optimized at a sub-frame time level. By varying the light source brightness within the frame time, the light source can be used to compensate for the response time of the image modulator. For example, if the green value for a given pixel is transitioning from 100 to the maximum 255, and the LCD modulator material can not change within a frame time to the maximum, the green LED can be driven earlier in the frame and to a higher brightness level and then reduced to the desired brightness level as the LCD modulator material is able to fully transition to the 255 value.

Sensor readings, in step 818, can be performed during the normal operating mode of the system or during a test and configuration mode. Step 818 utilizes FIG. 6 sensors 632*a-f* and their respective sensor circuits 638 as well as other optical sensors, environment sensors and image sensors (cameras) to feed back information to the DOP 230 for use in display setup step 808. As noted earlier, display setup step 808 receives input on a feedback path 832 from display controls step 812 where the FIG. 4 sensor input 426 and DM 402 can correlate the output information and the recorded sensor readings to determine if any adjustments to display setup are required. Temporary adjustments can be processed dynamically by the different processing blocks whereas more permanent adjustments would typically be processed by the DM 402 and written into the non-volatile memory for the display map.

Certain sensors, such as a temperature sensor, may more directly affect the MLC 420 output controls for the light source if the effects of temperature on light output are well known. Based on a measured temperature, the PWM may be increased for one or more of the light sources. In the multicolor light source case, if one of the light sources is already at maximum value, the other light sources may need to be lowered as to maintain the proper white balance for the overall display. This is at the expense of brightness, but is still better than having a display that has inaccurate color representation.

Step 818 can also be utilized during a test or calibration mode when the display is not actively being used. In the calibration mode, the display setup step 808 indicates to display controls step 812 what light source outputs and images to produce. A light source calibration procedure would sequence through different values for each light source or combination of light sources and utilize the appropriate sensors to record the brightness and wavelength. Response time for the light sources can similarly be measured where the sensor samples the brightness and wavelength at intervals less than a frame time. The transition times between different output values can be measured and recorded. Depending on the placement of the sensors, during calibration the image modulator may be turned off to best block the light sources and DOP 230 could step through a light source calibration procedure.

Similarly, in step 818, DOP 230 may calibrate the image modulator using sensors such as digital cameras. Such cameras would likely have to be external to a flat panel display system but the cameras could be either external or built into a projection display system. In the modulator calibration procedure, various images are displayed on the screen while the digital camera captures a portrayal of such images. The captured images are analyzed and compared to the expected values and various adjustments to the DOP 230 can be made. For a projection system, the Geometric Transformation 404 adjustments either directly or via DM 402 may be necessary as described with reference to FIG. 4. Other non-visible output and capture techniques, such as those in the infrared spectrum could also be used by the system to calibrate either light sources or images. These calibration procedures would be used to determine light source display mapping and image mapping information and could be stored in non-volatile memory or in dynamic memory. The values could be stored in a variety of ways and could be compressed via several different prior art means to save on the amount of storage required.

The present invention has been explained above with reference to several embodiments. Other embodiments will be apparent to those skilled in the art in light of this disclosure. For example, DOP 230 may be implemented in various configurations including hardware, software, some combination of fixed function, configurable logic, or programmable hardware. These and other variations upon the preferred embodiments are contemplated by the present invention, which is limited only by the appended claims.

I claim:

1. A display comprising:
one or more light source modulators including a plurality of light source controls to dynamically vary the brightness of LED light sources at multiple locations of said display;
a display modulator including an array of individually controllable pixels;
one or more light sensors that, when necessary, feed back real time readings measuring the brightness from said light source modulators and store said measurements; and
a controller, connected both to said plurality of light source controls and to said display modulator, that receives an incoming data stream and, based both on values of the incoming data stream and on the stored measurements from said sensors, dynamically determines and controls at different ones of said locations the values for said light source brightness and the values for said display modulator array of pixels.

2. The display of claim 1 wherein said light sources provide a plurality of different wavelengths of light and said sensors, when necessary, feed back real time measurements of both brightness and wavelength.

3. The display of claim 1 wherein said plurality of light source controls to control brightness has lower granularity than the resolution of the array of pixels.

4. The display of claim 1 wherein each individually controllable pixel includes different wavelength sub-pixels and the brightness of each sub-pixel is modulated individually.

5. The display of claim 4 wherein each said sub-pixel has a local additional light source.

6. The display of claim 1 wherein said controller utilizes one or more frames of prior display data in order to temporally control the light source modulators and the display modulators to portray motion accurately on said display.

7. A display controller comprising:
  controls for one or more LED light source modulators which can vary brightness across a display;
  controls for individual pixels of a display modulator array of pixels;
  one or more inputs to receive data fed back, when necessary, from real time sensor readings;
  one or more inputs to receive real time display data; and
  processing modules to perform low latency processing of the real time display data and of data stored from sensor readings to control said light source modulators and said display modulator pixels in real time to create a high quality display.

8. The display controller of claim 7 wherein said controls for light source modulators include individual controls for different wavelengths of light and including light sources having lower resolution than the display modulator array of pixels.

9. The display controller of claim 7 wherein said controls for the array of pixels include:
  sub-pixel brightness controls for the full resolution of pixels; and
  brightness controls for light sources that have lower resolution than the array of pixels.

10. The display controller of claim 7 wherein said processing modules utilize one or more frames of prior display data to perform temporal controls of said light source modulators and said individual pixels to portray motion at very high quality.

11. The display controller of claim 7 wherein said input of real time data is enhanced and utilized by one of said processing modules which then produces controls for the light source modulators and individual pixels to increase the dynamic range of an output image.

12. The display controller of claim 7 wherein received real time display data is enhanced and utilized by one of said processing modules which then produces controls for the light source modulators and individual pixels to increase the color gamut of the output image.

13. The display controller of claim 7 wherein said processing modules for real time display data produce controls for dynamically adjusting the ambient lighting around the display.

14. A method for displaying an image having high image quality, high color gamut and high dynamic range, comprising:
  processing a real time display data stream;
  processing display configuration parameters determined by real time sensor feedback;
  processing, including spatial processing, of the display data stream;
  producing controls to modulate one or more LED light sources to vary the brightness across a display; and
  producing controls to perform image modulation for a full resolution display.

15. The method of claim 14 wherein said spatial processing includes temporal processing of two or more frames of display data.

* * * * *